United States Patent
Ryan

(10) Patent No.: US 12,249,082 B2
(45) Date of Patent: Mar. 11, 2025

(54) ARTICLE IDENTIFICATION AND TRACKING

(71) Applicant: SITA Information Networking Computing UK Limited, Hayes Middlesex (GB)

(72) Inventor: Sid Ryan, Montreal (CA)

(73) Assignee: SITA Information Networking Computing UK Limited, Middlesex (GB)

( * ) Notice: Subject to any disclaimer, the term of this patent is extended or adjusted under 35 U.S.C. 154(b) by 411 days.

(21) Appl. No.: 17/638,234

(22) PCT Filed: Aug. 25, 2020

(86) PCT No.: PCT/GB2020/052037
§ 371 (c)(1),
(2) Date: Feb. 25, 2022

(87) PCT Pub. No.: WO2021/038218
PCT Pub. Date: Mar. 4, 2021

(65) Prior Publication Data
US 2023/0186509 A1    Jun. 15, 2023

(30) Foreign Application Priority Data

Aug. 29, 2019 (GB) .................................... 1912428
Dec. 19, 2019 (GB) .................................... 1918893
Mar. 26, 2020 (EP) .................................... 20166042

(51) Int. Cl.
*G06V 20/52* (2022.01)
*G06T 5/50* (2006.01)
(Continued)

(52) U.S. Cl.
CPC ................ *G06T 7/254* (2017.01); *G06T 5/50* (2013.01); *G06T 7/73* (2017.01); *G06V 10/28* (2022.01);
(Continued)

(58) Field of Classification Search
None
See application file for complete search history.

(56) References Cited

U.S. PATENT DOCUMENTS

| | | | |
|---|---|---|---|
| 7,104,453 B1 * | 9/2006 | Zhu | G01S 17/88 235/462.07 |
| 2009/0304230 A1 * | 12/2009 | Krahnstoever | G06T 7/292 382/103 |

(Continued)

FOREIGN PATENT DOCUMENTS

| | | |
|---|---|---|
| EP | 3270342 A1 | 1/2018 |
| EP | 3786836 A1 | 3/2021 |
| WO | 2021038218 A1 | 3/2021 |

OTHER PUBLICATIONS

Czyzewski A., et al., "Multi-Stage Video Analysis Framework," Video Surveillance, InTech, Feb. 3, 2011, 28 Pages. Section 3-5 and 7, Figures 4.14, p. 160, Paragraph 2, DOI:10.5772/16088, ISBN 978-953-30-7436-8, XP055729003.

(Continued)

*Primary Examiner* — Tsung Yin Tsai
(74) *Attorney, Agent, or Firm* — Morris, Manning & Martin, LLP; Daniel E. Sineway, Esq.; Adam J. Thompson, Esq.

(57) ABSTRACT

Methods for identifying and tracking an article are disclosed. During a journey, an article follows a path between an origin and a destination. An image of the article is (Continued)

captured during the journey and a first characteristic vector determined from the image of the article. The first characteristic vector is compared with a set of predetermined characteristic vectors and, based on the comparison, the first article is either associated with an identifier associated with a corresponding one of the predetermined characteristic vectors, or is associated with a new identifier.

20 Claims, 16 Drawing Sheets

(51) Int. Cl.
| | |
|---|---|
| G06T 7/254 | (2017.01) |
| G06T 7/73 | (2017.01) |
| G06V 10/28 | (2022.01) |
| G06V 10/774 | (2022.01) |
| G06V 10/82 | (2022.01) |
| G06V 20/00 | (2022.01) |
| G06V 30/162 | (2022.01) |
| G06V 30/10 | (2022.01) |

(52) U.S. Cl.
CPC ............ *G06V 10/774* (2022.01); *G06V 10/82* (2022.01); *G06V 20/00* (2022.01); *G06V 20/52* (2022.01); *G06V 30/162* (2022.01); *G06V 30/10* (2022.01); *G06V 2201/07* (2022.01)

(56) References Cited

U.S. PATENT DOCUMENTS

| | | | | |
|---|---|---|---|---|
| 2012/0033083 | A1* | 2/2012 | Horbinger | H04N 7/181 |
| | | | | 382/103 |
| 2013/0155229 | A1 | 6/2013 | Thornton et al. | |
| 2016/0117631 | A1 | 4/2016 | McCloskey et al. | |
| 2017/0004384 | A1 | 1/2017 | Audo et al. | |
| 2018/0018627 | A1* | 1/2018 | Ross | G06F 16/583 |
| 2022/0139067 | A1* | 5/2022 | Liu | G06V 10/762 |
| | | | | 382/103 |

OTHER PUBLICATIONS

Extended European Search Report for European Application No. 20166042.0, mailed Jan. 12, 2021, 10 Pages.
Extended European Search Report for European Application No. 20172992.8, mailed Feb. 10, 2021, 12 Pages.
International Preliminary Report on Patentability for International Application No. PCT/GB2020/052037, mailed Mar. 10, 2022, 09 Pages.
International Preliminary Report on Patentability for International Application No. PCT/GB2020/053264, mailed Jun. 30, 2022, 11 Pages.
International Search Report and Written Opinion for International Application No. PCT/GB2020/053264, mailed Mar. 23, 2021, 13 Pages.
Partial European Search Report for European Application No. 20172992.8, mailed Nov. 4, 2020, 15 Pages.
Viola P., et al., "Rapid Object Detection Using a Boosted Cascade of Simple Features," Proceedings 2001 IEEE Conference on Computer Vision and Pattern Recognition, Cvpr 2001, Kauai, Hawaii, IEEE Computer Society, Los Alamitos, C, Dec. 8-14, 2001, vol. 1, pp. 511-518, 9 Pages, Section 2-4, Figures 1.4, ISBN 978-0-7695-1272-3, XP010583787.
International Search Report & Written Opinion, issued in International Patent Application No. PCT/GB2020/052037, mailed Oct. 30, 2020; 11 pages.
Communication pursuant to Article 94(3) EPC issued in European application No. 20166042.0, dated Nov. 8, 2022.
Martin Johnson et al: "Real-time baggage tracking using a modified background subtraction algorithm", Mechatronics and Machine Vision in Practice (M2VIP), 2012 19th International Conference, IEEE, Nov. 28, 2012 (Nov. 28, 2012), pp. 200-204, XP032346594, ISBN: 978-1-4673-1643-9.
Anonymous: "Convolutional neural network—Wikipedia", Jul. 29, 2019 (Jul. 29, 2019), XP055735969.
Camps, O., et al. "From the lab to the real world: Re-identification in an airport camera network." IEEE transactions on circuits and systems for video technology 27.3 (2017): 540-553. (Year: 2017).
Non-Final Office Action for U.S. Appl. No. 17/781,887 dated Sep. 23, 2024, 25 pages.

* cited by examiner

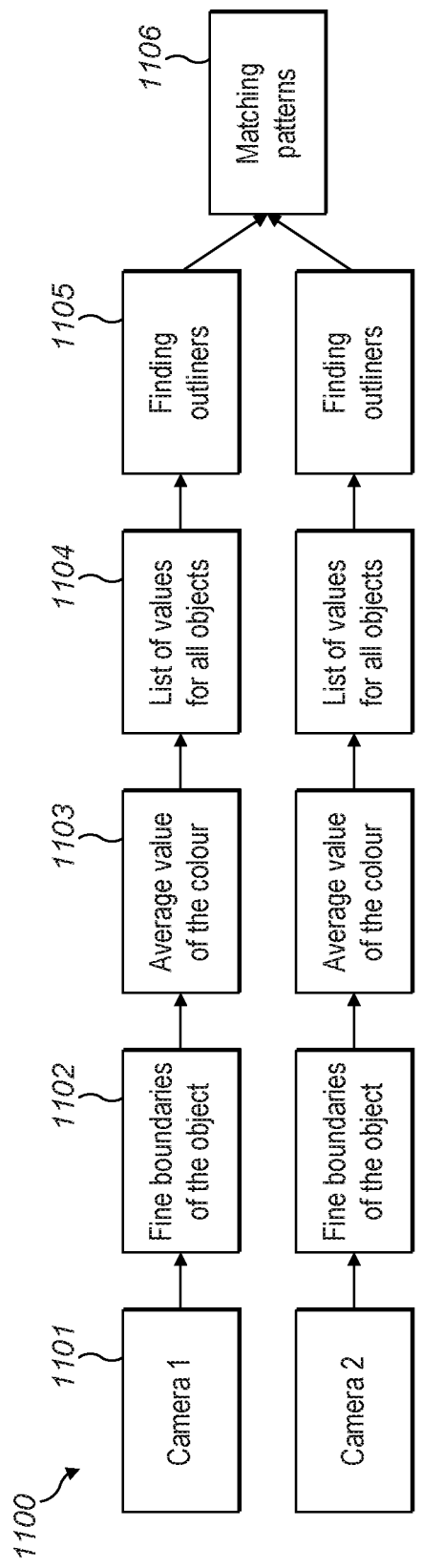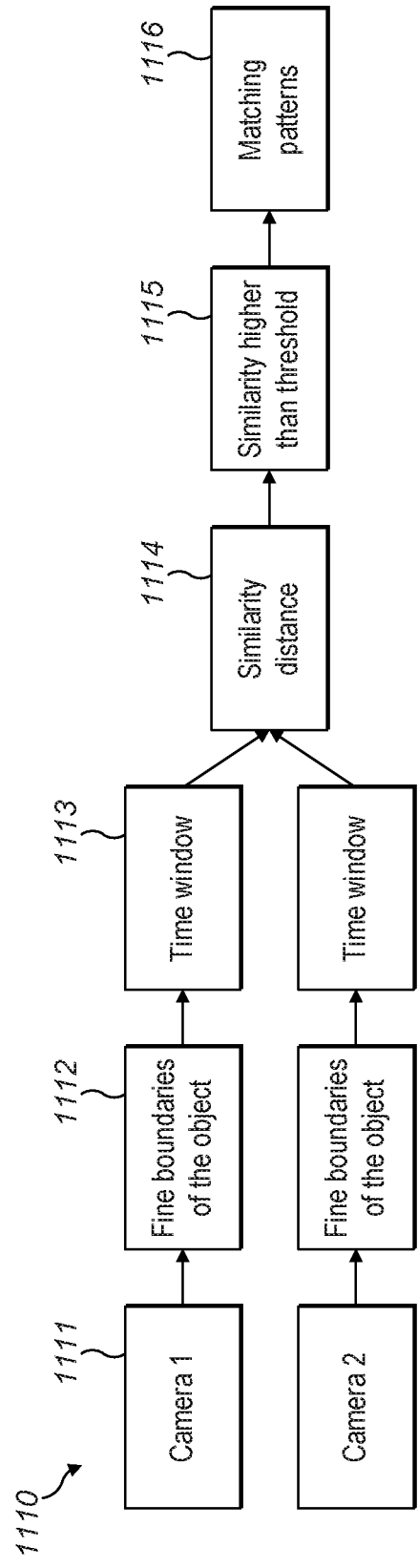

ARTICLE IDENTIFICATION AND TRACKING

CROSS REFERENCE TO RELATED APPLICATIONS

This application is a national phase application of, and claims benefit of and priority to International Application No. PCT/GB2020/052037, filed Aug. 25, 2020, entitled "ARTICLE IDENTIFICATION AND TRACKING," which claims priority to European Application No. 20166042.0, filed Mar. 26, 2020, entitled "ARTICLE IDENTIFICATION AND TRACKING," Great Britain Application No. 1918893.7, filed Dec. 19, 2019, entitled "IMAGE PROCESSING SYSTEM AND METHOD," and Great Britain Application No. 1912428.8, filed Aug. 29, 2019, entitled "LUGGAGE IDENTIFICATION VIA IMAGE RECOGNITION," the disclosures of which are herein incorporated by reference as if set forth herein in their entireties.

FIELD OF THE INVENTION

This invention relates to methods and systems for positively identifying articles or finding similarities relating to features of articles. Further, this invention relates to image processing and machine learning methods and systems. It is particularly, but not exclusively, concerned with uniquely identifying baggage or packages and handling methods and systems, for example operating at airports, seaports, train stations, other transportation hubs or travel terminals.

BACKGROUND OF THE INVENTION

The Air Transport Industry transports around 2.25 billion bags annually, however approximately 45,000,000 bags (2%) are mishandled. Baggage handling performance has therefore become a very high priority for the majority of airlines and airports in order to improve customer satisfaction and avoid compensation payouts.

The majority of mishandled bags occur where a bag tag is missing, or the bag tag was not correctly identified (for example, when the bag tag is not correctly aligned with a laser reader) and sorted incorrectly. Where a bag tag is missing, known solutions involve using the IATA standardized bag categories list and matching the identified bag category with the passenger's description of their lost bag. Where a bag tag is not correctly aligned, a baggage handler is required to manually identify the bag using a handheld laser tag reader and to relocate the bag to the correct location. In both scenarios the rectification process is passive, requiring several labour intensive and expensive processes and devices. This is because bags that are mishandled are often very difficult to identify, and automatic tag reading (ATR) devices are expensive to implement and require constant maintenance.

It is therefore desirable to overcome or ameliorate the above limitations of the currently known processes for managing mishandled articles, such as packages or other items of baggage such as a bag, case, suitcase, or other container that can be checked into the hold of an aircraft.

SUMMARY OF THE INVENTION

The invention is defined by the independent claims, to which reference should now be made. Preferred features are laid out in the dependent claims.

According to a first aspect of the invention, there is provided a method for tracking an item, the method comprising the steps of: receiving a plurality of images of a plurality of articles following a path between an origin and a destination; determining a characteristic vector associated with each image wherein the characteristic vector defines a plurality of characteristic features associated with each article; comparing the characteristic vector to a plurality of predetermined further characteristic vectors associated with a plurality of further images of articles wherein each of the further images is associated with an identifier; and associating one of the further images with one of the identifiers based on the comparison.

Embodiments of the invention further comprise determining a subset of characteristic vectors based on a degree of similarity between each of the characteristic vectors associated with each image and the predetermined further characteristic vectors associated with the plurality of further images.

In further embodiments of the invention the origin is a departure airport and the destination is an arrival airport.

In further embodiments of the invention the plurality of images of a plurality of articles comprise a first set of pictures of different items taken, by a first recording means, at a first location between the origin and destination.

In further embodiments of the invention wherein the plurality of images of a plurality of articles comprise a second set of pictures taken, by a second recording means, at a second location between the origin and destination wherein the first location is different from the second location.

In further embodiments of the invention wherein first location is adjacent to or neighboring the second location.

In further embodiments of the invention wherein each vector comprises any one or more of features defining shape, colour, alpha-numeric text, texture, bag type, a sticker characteristic of the bag, a buckle, lock, retractable handle straps, wheel, zip, or material type associated with an item.

In further embodiments, the method further comprises receiving an input video comprising the plurality of images.

In further embodiments, the method further comprises detecting an item of luggage in one or more of the images preferably using a background subtraction algorithm to generate a foreground mask image.

In further embodiments, the method further comprises generating a background model for each location by training a network with images of an item carousel for moving the item past each recording means.

In further embodiments, the method further comprises generating a different background model for each location by training a network with images of an item carousel taken at each location.

In further embodiments, the method further comprises grouping pixels associated with the foreground mask image into continuous regions of pixels having the same colour.

In further embodiments, the method further comprises determining the width or and height of each of the continuous regions and discarding pixels associated with these regions if the regions extend the entire width or height of the frame.

In further embodiments, the method further comprises selecting one of the characteristic vectors in the subset of characteristic vectors based on a timestamp defining a time when each of the further images was taken.

In further embodiments, the method further comprises selecting one of the characteristic vectors in the subset of characteristic vectors based on data defining the origin and destination wherein the data defining the location associated with the origin and destination and a location where the further image is taken by the first or second recording means.

In further embodiments, the method further comprises down sampling the further images and preferably maintaining an aspect ratio of the images.

In further embodiments, the method further comprises training a network using an augmented training image data set by applying any one of a random rotation, a random scale change a random photometric distortion to a training data set.

In further embodiments, the method further comprises comparing images of the same bag captured by two different recording means and only determining the characteristic vector is the same bag is captured by both recording means.

In further embodiments, the method further comprises determining whether the image brightness is greater than a first threshold or less than a second threshold and only processing the image if the image brightness is within the first and second thresholds.

In further embodiments, the method further comprises determining a colour associated with a carousel.

In a second aspect of the invention, there is provided a method of tracking an article comprising the steps of: receiving a first image of a first article and associating the first article with a customer identifier; storing the first image and associated customer identifier in a database containing a plurality of images of different articles, each article being associated with a customer identifier; calculating, for each image in the database, a characteristic vector associated with each article; plotting each characteristic vector in a hyperspace; receiving a further image of the first article during a journey; calculating a further characteristic vector based on the further image of the first article; plotting the further characteristic vector in the hyperspace; calculating a score corresponding to the spatial separation between the further characteristic vector and each of the other characteristic vectors in the hyperspace; determining a subset of characteristic vectors corresponding to the most similar images based on the spatial separation score; identifying from the subset of characteristic vectors the closest characteristic vector; and identifying the customer identifier associated with the closest characteristic vector.

In a third aspect of the invention there is provided a system for tracking an article comprising processing means for executing the method of the first or second aspects.

In a fourth aspect of the invention there is provided a computer program product which when executed undertakes the method of the first or second aspects.

Embodiments of the invention seek to address the above described problems by using artificial intelligence to uniquely identify an article based on one or more images associated with the article.

The aim is a baggage recognition solution based on a video input. Given an input query image showing a baggage item, the solution should efficiently and effectively find images of the same baggage recorded by different cameras.

This may be performed at check-in, or subsequent to check-in using a computer or server or mobile telephone or other portable computing device. The image is then processed, noting what the probable bag properties are, according to the identification, usually with an associated degree of certainty. This may be performed for each bag processed at an airport. These categories may then be recorded in a database and processed using a baggage identification program, or displayed, to assist in baggage handling system.

One advantage of being able to uniquely identify an article using image(s) is the possibility of scaling up the system to cover a large area only by adding cameras. The method can be extended for similarity detection of all articles including face features, device relocation, identifying anomalies in the environment. The system can be used using one or more cameras to cover all sides of an article. Currently, there are no existing automated methods for performing such a procedure. The embodiments of the invention may use a one or more computer vision models combined or in an ensemble, to identify various different features of an article (for example bag). In this context, computer vision is understood to mean the high-level processing of digital images/video by acquiring and processing data in order to analyse and understand it. Computer vision techniques may include video sequences, multiple cameras analysis, and multi-dimensional data processing. Additionally, computer vision techniques may also include applying scene reconstruction, event detection, video tracking, object recognition, 3D pose estimation, learning, indexing, motion estimation, and image restoration.

Preferably, embodiments of the invention may comprise resizing or change the representation of an input image to improve performance speed. Embodiments of the invention use various cameras on the baggage journey steps and records the images of the bags with timestamps. The embodiments of the invention may also label bag images with tag number using ATR reads or with and APIs and the airline database. The machine learning techniques then create a dataset of bag images and their extracted features and may also save tag number for bag image. In addition, embodiments of the invention may comprise processing using preprocessing, image processing techniques, and computer vision methods.

Embodiments of the invention may generate a feature vector for each bag and calculated feature distances in ascending order based on distance values. This machine learning project will be completed in multiple stages. The process of the videos from different cameras creates labelled dataset containing cropped images of individual baggage items.

Several (millions) bag images, each baggage from various angles (in different places of the conveyor belt), recorded and were used to train machine learning models. The synchronization of the cameras results in correlating and labeling articles that that appear on different cameras. These may be stored in a database.

Compared to existing article recognition and identification systems, embodiments of the invention have the advantages of:

The cost of implementing embodiments of the invention is significantly lower than Automatic Tag Reading (ATR) systems;

The computer-based method results in a faster process than a person examining each bag by a hand held laser tag reader device;

The images can form a database and be used for other purposes such as damage and anomaly detection;

It is easier to integrate embodiments of the invention with current tag reading systems; and There is no requirement for labelled images and there is no limit to the number of classes.

BRIEF DESCRIPTION OF THE DRAWINGS

Embodiments of the invention will now be described, by way of example only, with reference to the accompanying drawings, in which:

FIGS. 11A and 11B are flow diagrams showing the sub-steps that comprise the process steps of synchronizing cameras for similar articles in various input data sources;

DETAILED DESCRIPTION

Figure 1:
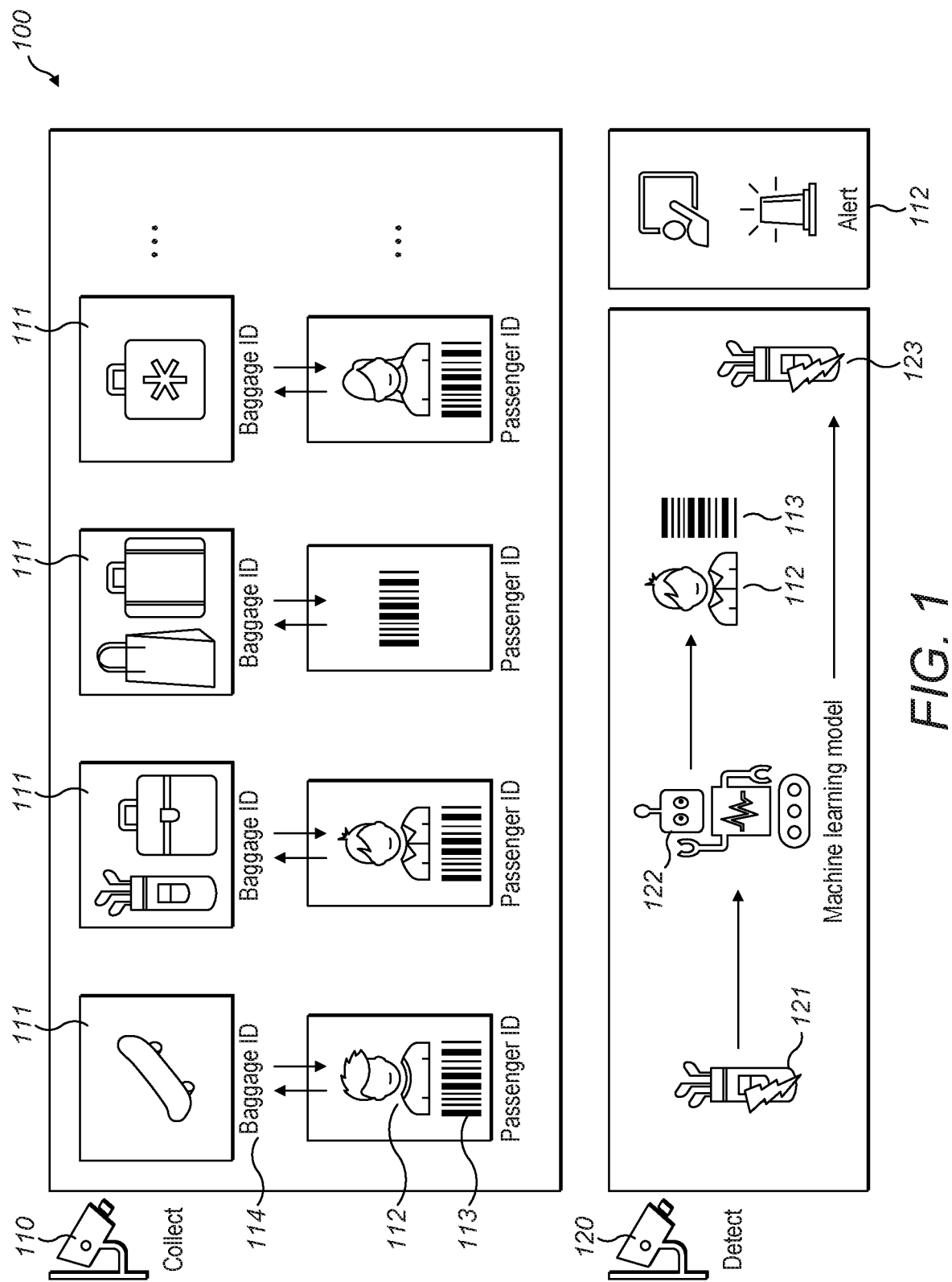
FIG. 1 is a schematic diagram showing an example process flow of an embodiment of the invention.

The following exemplary description is based on a system, apparatus, and method for use in the aviation industry. However, it will be appreciated that the invention may find application outside the aviation industry, including in other transportation industries, or delivery industries where items are transported between locations. In particular, embodiments of the invention may be utilised in transportation terminals, on board cruise ships, security checks in buildings, parcel delivery and/or storage spaces.

The following embodiments described may be implemented using a Python programming language using for example an OpenCV, TensorFlow, Keras libraries.

Embodiments of the invention solve the problems described above by providing a system that is not required to scan an article identifier in order to identify a particular article. Instead, ATR techniques are leveraged to locate and identify features of the article using cameras and machine learning models. In this way, the system can automatically identify articles in a unique way by identifying a set of features inherently unique to the article.

The system according to the claimed invention is able to dramatically reduce operational costs compared to the operational costs associated with implementing and maintaining known rectification systems for mishandled articles. This is because there is no need for the labour-intensive manual examination of each article in order to correctly identify a mishandled article.

Instead, machine learning methods are employed in an article recognition system that is able to perform feature detection and comparison from camera inputs. This enables the system to identify a set of unique characteristic features (such as a dent, sticker, added marker or unusual shape) associated with an article that is used to uniquely identify the article in place of a physical article identifier, such as a traditional printed barcode bag tag.

Preferred embodiments of the claimed invention beneficially have the following advantages. Firstly, the system is more environmentally friendly compared to traditional systems that use paper bag tags as there is no longer a requirement for printing the bag tags on paper. Secondly, the amount of mishandled bags is reduced through the use of an automated process that does not require a physical bag tag, as outlined above. Thirdly, the system reduces aircraft turn-around time by automatically establishing if the correct onward bag is loaded onto the correct departing aircraft without needing to physically scan any bags. Finally, the system can advantageously improve the reconciliation process when a passenger claims their baggage by ensuring the correct passenger picks up the correct terminating bag from a baggage carousel.

Additionally, the data provided by preferred embodiments of the invention beneficially provides further advantages that are not possible with known systems processes, such as anomaly detection and damage detection. Further, embodiments of the claimed invention are also able to advantageously enable a system to track damages caused when in transit by producing a comprehensive and consistent database of article images for each passenger that can be accessed in case of a damages claim by a passenger.

System Operation and Overview

FIG. 1 shows a high level overview 100 of an embodiment of the invention.

In a collection phase 110, images of deposited articles 111 are associated with the corresponding passenger 112 who deposited the article 111. In preferred embodiments, this is achieved by identifying a unique passenger identifier 113 for each passenger and a unique baggage identifier 114 for each article of baggage.

In a detection phase 120, an image of an article of baggage 121 is captured by a camera while the article 121 is travelling on a journey, for example on a baggage sortation conveyor belt. In some embodiments of the invention, a plurality of images may be obtained of an article of baggage at the same location from different perspectives. Additionally, a plurality of images of the same article may be captured at different locations on a journey path.

In preferred embodiments implemented in the Air Transport Industry (ATI), images of each article are captured during at least four different processing stages during a baggage journey. For example, a first stage may be at check-in or at a bag drop location where the images captured enable an airline to know how many items of baggage have been accepted by the airline. A second stage may be when baggage is loaded onto an aircraft where the images may inform the airline a particular bag has departed from the originating airport on a flight. A third stage may be when baggage is transferred between flights at an intermediate airport where the images may inform an airline that a particular bag is available to transfer onto a connecting flight. Finally, a fourth stage may be at an arrivals carrousel where images of the baggage may inform the airline that the bag journey is over, and the bag has been successfully delivered.

The image 121 is processed and analyzed by a machine learning algorithm 122 and identified by matching the image 121 to the set of images of deposited articles 111. Once identified, the associated passenger 112 and passenger identifier 113 may be determined. In some embodiments, article processing anomalies or damage to the article may be tracked over time by comparing historical images of the article 123.

In the event that an anomaly or damage is detected, a response phase 130 is initiated, as further described below.

The progress of the article of baggage and the status thereof may be monitored throughout the baggage journey process.

As shown in FIG. 1 of the drawings, one or more machine learning algorithms, or models, 122 may be used to uniquely identify an article of baggage and create a database of bag images and passenger identifiers and/or biometrics. These models are described in more detail below and may include known machine learning models such as Triplet networks and Siamese networks. The model 122 is trained using a training data set of images of bags in different locations and/or from various angle viewpoint of cameras. In addition, the training data may be associated with values defining a timestamp value and an article tag numbers to uniquely identify the article of baggage.

The model is trained to identify various characteristics of an article of baggage. In preferred embodiments, this is achieved using one or more specific sub-models.

For example, a type model may be trained to categorise an image of a bag according to one or more of the following predetermined categories shown below in Table 1:

TABLE 1

Type Precisions of different baggage classifications determined according to an embodiment of the invention.

| Label | Name | Precision | N |
|-------|------|-----------|---|
| T01 | Horizontal design Hard Shell | 0.000 | 6 |
| T02 | Upright design | 0.889 | 476 |
| T03 | Horizontal design suitcase Non-expandable | 0.000 | 3 |
| T05 | Horizontal design suitcase Expandable | 0.000 | 5 |
| T09 | Plastic/Laundry Bag | 0.000 | 3 |
| T10 | Box | 0.939 | 33 |
| T12 | Storage Container | 0.000 | 5 |
| T20 | Garment Bag/Suit Carrier | 0.000 | 5 |
| T22 | Upright design, soft material | 0.000 | 26 |
| T22D | Upright design, combined hard and soft material | 0.944 | 748 |
| T22R | Upright design, hard material | 0.932 | 2062 |
| T25 | Duffel/Sport Bag | 0.379 | 29 |
| T26 | Lap Top/Overnight Bag | 0.357 | 42 |
| T27 | Expandable upright | 0.397 | 267 |
| T28 | Matted woven bag | 0.000 | 2 |
| T29 | Backpack/Rucksack | 0.083 | 12 |

In addition to the types identified in Table 2, the following additional bag categories may be defined. A label of Type 23 indicates that the bag is a horizontal design suitcase. A label of Type 6 indicates that the bag is a brief case. A label of Type 7 indicates that the bag is a document case. A label of Type 8 indicates that the bag is a military style bag. However, currently, there are no bag types indicated by the labels Type 4, Type 11, Type 13-19, Type 21, or Type 24.

In Table 1, N defines the number of predictions for each bag category or name, for example "Upright design", and the label is a standard labelling convention used in the aviation industry. Preferably, a filtering process may be used to remove very dark images based on an average brightness of pixels associated with the image.

An external elements model may be trained using the training data set of images to determine characteristics of the bag's external elements, such as the following predetermined categories shown in Table 2:

TABLE 2

Different external elements classifications and precisions with score threshold = 0.2. If the prediction gives a probability of less than 0.2, then the data is not included. The buckle and zip categorisations may advantageously provide for improved item classification.

| Name | Recall | N_act | Precision | N_pred |
|------|--------|-------|-----------|--------|
| buckle | 0.300 | 40 | 0.203 | 59 |
| combo_lock | 0.921 | 1004 | 0.814 | 1137 |
| retractable_handle | 0.943 | 421 | 0.827 | 480 |
| straps_to_close | 0.650 | 197 | 0.621 | 206 |
| wheel | 0.988 | 1549 | 0.932 | 1642 |
| zip | 0.910 | 1539 | 0.914 | 1531 |

Finally, a material model may be trained using the training data set of images to determine a material type of the bag. For example, the material model may categorise an image of a bag according to one or more of the following predetermined categories shown in Table 3:

TABLE 3

Different material classifications and precisions.

| label | name | precision | N |
|-------|------|-----------|---|
| D | Duel Soft/Hard | 0.816 | 437 |
| L | Leather | 0.000 | 3 |
| M | Metal | 0.000 | 3 |
| R | Rigid (Hard) | 0.932 | 1442 |
| T | Tweed | 0.444 | 57 |

Once one or more of the models have been trained using the training data, embodiments of the invention uses one or more trained models to identify the articles by extracting, mapping and comparing their unique features.

Each model may be trained using a convolutional neural network with a plurality of nodes. Each node has an associated weight. The neural network usually has one or more nodes forming an input layer and one or more nodes forming an output layer. Accordingly, the model may be defined by the neural network architecture with parameters defined by the weights.

Thus, it will be appreciated that the neural network is trained. However, training of neural networks is well known to the skilled person, and therefore will not be described in further detail.

Figure 2:
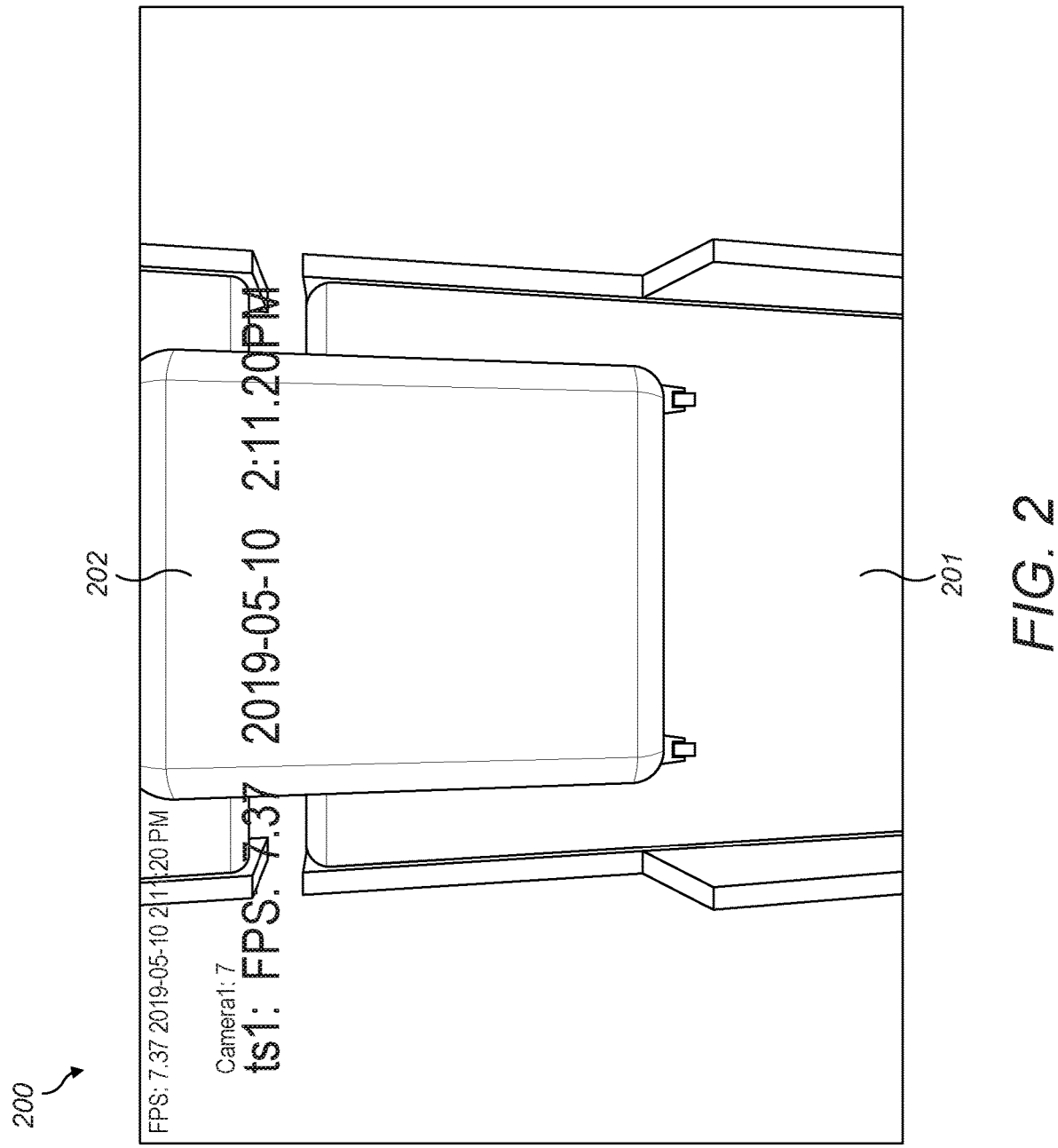
FIG. 2 is an exemplary image obtained from a camera in an airport environment.

FIG. 2 illustrates using optical character recognition (OCR) to capture written components from videos of an article as it passes by on a conveyor belt in a baggage handling system. In the example of FIG. 2, a camera is situated above a conveyor belt 201 to capture an image 200 of the article 202 from directly above. In other embodiments, further cameras may also capture footage of the article from different viewpoints. For example, a second camera may be situated at one side of the conveyor belt to capture footage of the article from the side as the article passes by.

Each camera is configured to provide high quality images of the articles of baggage by reducing the number of unnecessary background pixels and improving the capture of informative features such as wheels and handles. For example, the shutter speed and other image capturing configurations are set to capture the highest quality data, and the storage format is set as the highest quality possible when considering the networking and local storage capacities. In some embodiments, a data or image compression method is used to improve the performance of the transfer and storage of data.

Figure 3:
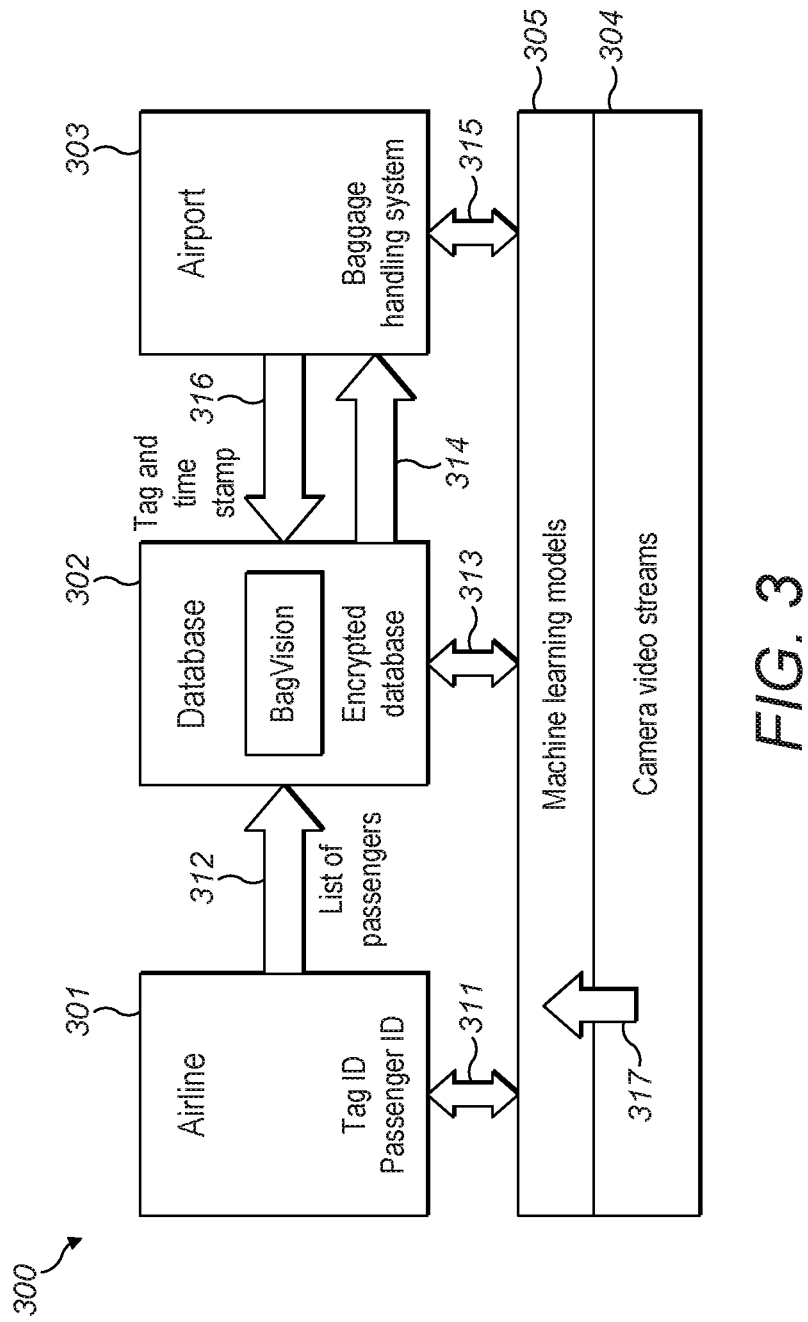
FIG. 3 is exemplary schematic diagram of a data collection system for the collection and recognition of images and the flow of data for a baggage handling system.

FIG. 3 shows a high-level example data flow 300 of an embodiment of the invention between different hardware elements.

As shown in FIG. 3, the hardware elements include Airline Systems 301, Remote Databases 302, Airport BHS Systems 303, Camera Arrays 304, and a Machine Learning Core 305. Data 311 including bag identifiers and passenger identifiers is exchanged between the airline systems 301 and the machine learning core 305. Data 312 including a passenger list is sent from the airline systems 301 and the database 302. Data 313 including images of articles and associated metadata stored in a database is exchanged between the database 302 and the machine learning model 305, and is also send from the database 302 to the airport systems 303. For example, data 314 may comprise an article identifier associated with a uniquely identified article of baggage that is transmitted to the Airport Baggage Handling System 303 system for tracking the article of baggage during a bag journey. Data 315 is exchanged between the airport systems 303 and the machine learning model 305. Data 316 including a bag tag identifier and an associated timestamp are sent from the airport systems 303 to the database 302. Finally, data 317 including camera image data is sent from the camera array 304 to the machine learning model 305.

System Architecture

Figure 4:
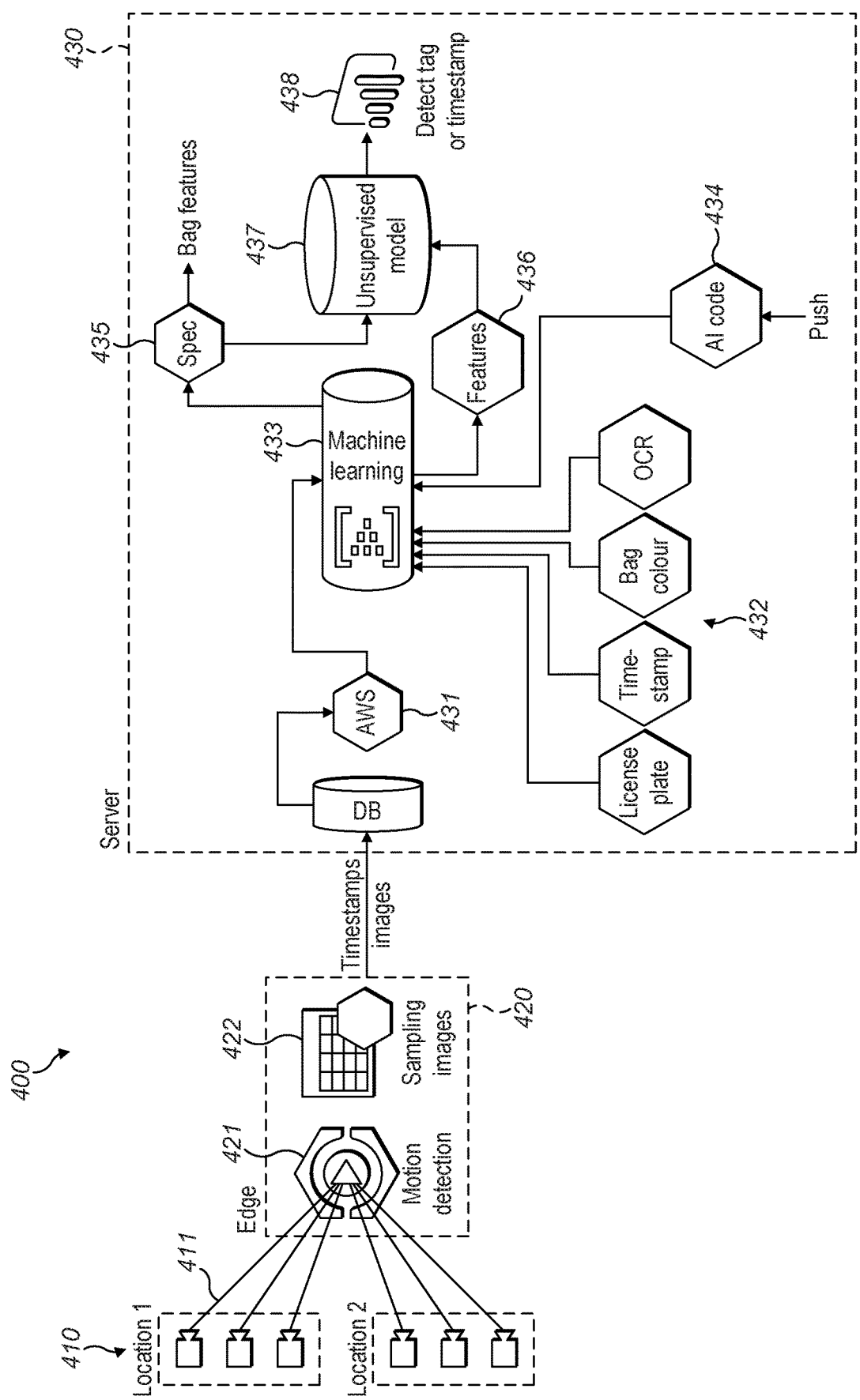
FIG. 4 is a schematic diagram of the system architecture according to an embodiment of the invention.

FIG. 4 illustrates an example system architecture 400 according to an embodiment of the invention.

The system comprises cameras 410 located at a plurality of different locations 411 that capture images and data relating to each deposited article. Cameras are also located at a plurality of locations in the baggage journey, including at a destination location.

An initial image is captured of the article at the beginning of the baggage journey, for example at check in or when deposited at a drop point. The initial image of the article is associated with a unique identifier that identifies the passenger that has deposited the article. It will be understood that a plurality of initial images of the article may be obtained, for example with two or more cameras located at a first location 411.

Further images of the article may be captured by cameras located throughout the baggage journey to monitor the progress of the article. Each image captured by the cameras is processed and analyzed in order to match the captured image with an image of a deposited article. In addition, a final image of the article may be captured when the article arrives at the destination location. Recognizing and identifying the article at the destination location may beneficially aid the reconciliation of a passenger with their article of baggage.

The system 400 further comprises an Edge module 420 that comprises one or more preprocessing modules 421 and one or more feature extraction modules 422. In some embodiments, the Edge module 420 may be a single-board processor, such as a Raspberry Pi board. The Edge module 420 may receive raw video data from the cameras 410 and perform one or more image preprocessing steps. For example, the Edge module may reduce the dimensionality of the raw data such that video frames that contain several frames of an empty belt are reduced to one best selected image of each bag captured by every camera. The preprocessed images of the bags may be encoded and then sent to a server 430, as described below. In such embodiments, the communication requirements of the system can be optimized to less than 1% of the network bandwidth initially required by the system since there is no need to stream all video data in raw format from each camera to the server. By only keeping useful and informative data, the network is not overwhelmed and network latency is significantly improved.

The preprocessing modules 421 remove noise from the captured images of the articles and detect, localize and track each article. The feature extraction modules 422 process each image and extracts images with highest features, associate each image with a timestamp and synchronize the input of all cameras 410.

The system further comprises a network or server 430 that receives and stores data and images received from cameras 410 and performs computational processes to determine the identifier associated with each article and to use that identifier to track each article of baggage during a journey. The data exchanged by the system can either exist in a central or distributed architecture, whereby a user may have access to the entirety of the original data or a user is provided with an anonymized set of data which enables articles of baggage to be tracked without revealing personal information relating to passengers.

In preferred embodiments, the server 430 comprises a database and AWS module 431, where data can be uploaded to be stored or further analyzed. In some embodiments, the database and AWS module 431 are cloud-based and used to create separate databases for each flight that lists all the deposited articles scheduled to be loaded onto the associated flight. In airport environments, baggage journeys follow predetermined routes between a drop-off location and a baggage collection location. The baggage routes may also include a number of intermediate locations, such as aircraft loading and unloading locations. Since all the deposited articles will start their journeys at a limited number of destinations (for example, the airline's check in desks or at a baggage drop-off location), the journey that an article will follow can be readily defined. Accordingly, details of the journey may be associated with each article in each database.

The system further comprises external sources of data 432 that store supplementary data that can be added to the image or its metadata. In the embodiment shown in FIG. 4, the external sources of data are provided by a License Plate module, a Timestamp module, a Bag Colour module, and an OCR module. In preferred embodiments, the supplementary data includes license plate tag number, timestamp of the recorded videos, bag color using an extra image processing method, and an OCR algorithm that extracts written digits and characters of images as a feature.

In preferred embodiments, the server 430 further comprises one or more main machine learning cores 433 that include a first set of machine learning algorithms to extract feature vectors from each captured image and identify an associated customer ID from the extracted feature vector.

For example, in some embodiments, the colour of an article may be classified using a colour mapping process according to a plurality of different colour definitions. These may be classified according to the hue, saturation and value (H, S and V) definitions of a plurality of different colour categorisations in which the different colours are defined according to the values defined in the Table 4.

TABLE 4

The H, S, and V definitions of a number of predetermined different colour classifications.

| Label | Color | H | V | S |
|---|---|---|---|---|
| wt | white | 0 | 100 | 0 |
| bk | black | 0 | 0 | 0 |
| gy | grey | 0 | 35 | 0 |
| gy | grey | 0 | 67 | 0 |
| bu | blue | 203 | 41 | 77 |
| bu | blue | 206 | 88 | 55 |
| bu | blue | 187 | 45 | 94 |
| pu | purple | 270 | 53 | 50 |
| pu | purple | 300 | 47 | 54 |
| rd | red | 0 | 84 | 71 |
| rd | red | 343 | 92 | 34 |
| rd | red | 356 | 68 | 65 |
| yw | yellow | 53 | 100 | 72 |
| yw | yellow | 30 | 96 | 73 |
| yw | yellow | 40 | 99 | 68 |
| be | beige | 58 | 100 | 28 |
| be | beige | 36 | 91 | 35 |
| bn | brown | 44 | 37 | 43 |
| bn | brown | 30 | 29 | 33 |
| gn | green | 129 | 40 | 60 |
| gn | green | 66 | 85 | 69 |
| gn | green | 88 | 67 | 72 |
| bu1 | blue | 221 | 64 | 40 |
| bu2 | blue | 220 | 33 | 39 |
| bu3 | blue | 225 | 50 | 31 |

The values and labels bu1, bu2, and bu3 shown in bold are colour definitions which allow for a more precise colour determination of blue bags. This allows a bag colour to be uniquely mapped to a single one of the plurality of different predetermined colour classifications shown in Table 4.

The machine learning cores may also include a second set of machine learning algorithms that can detect anomalies in the journey of the article, which may occur when an article is not sorted correctly and arrives at the wrong location. In the event that the system 400 identifies an article that has been incorrectly sorted, lost, mishandled or damaged, the system will generate an alert that is sent as a message to inform the related authority.

The server further comprises one or more portals 434, such as an AI Code portal, that enable updating and downloading results of the machine learning core 433 remotely and one or more descriptor outputs 435 that produce the descriptive labels produced by the machine learning model 433. In preferred embodiments, the descriptor outputs can be paired or matched with a corresponding IATA code, which categorizes an article of baggage, in order to use semi-supervised methods for identifying missing bags. One or more non-descriptive vectors 436 may be produced that are based on the non-descriptive features of an article. The non-descriptive vectors 436 are used to identify the closest images to a selected image of an article, as further described below.

The server may further comprise one or more unsupervised model modules 437 which use algorithms such as a nearest neighbor-based model to identify the closest images to a selected image of an article based on the Euclidean distances between a feature vector of the selected image and the feature vectors of other images to uniquely identify similar articles of baggage, as further described below. In this context, unsupervised learning is a branch of machine learning that groups data that has not been labelled or categorized by identifying commonalities in the data.

Finally, in preferred embodiments the server further comprises one or more reverse mapping modules 438 that uniquely identify an article from the identified closest image using lookup tables, as further described below.

In preferred embodiments of the invention, the messaging or communication between different functional components of the system architecture is performed using the XML data format and programing language. However, this is exemplary, and other programming languages or data formats may be used, such as REST\JSON API calls. These may be communicated over HTTPS using wired or wireless communications protocols which will be known to the skilled person. Machine learning and computer vision methods and libraries may also be advantageously used. Pictures and videos obtained from cameras within the system may also be streamed to a local server or a cloud based data center.

In preferred embodiments, the different functional components described below may communicate with each other using wired (including Power Over Ethernet—PoE) or wireless communication protocols which will be known to the skilled person. The protocols may transmit service calls, and hence data or information between these components. Data within the calls is usually in the form of an alpha-numeric string which is communicated using wired or wireless communication protocols.

The system may comprise one or more different models, such as computer vision models and machine learning methods. In preferred embodiments, these models may include preprocessing, object tracking and extraction, pattern matching, object recognition, and the like. Each of the models may run on a separate computer processor or server, although it will be appreciated that some embodiments of the invention may in principle run on a single computer or server.

In preferred embodiments, a wired or wireless communications network is used to communicatively couple one or more of the functional components shown in FIG. 4 together, thereby allowing data exchange between each of the component(s). The network may also be used to receive an image of a bag captured by a camera or other recording devices. In all cases, wired or wireless communications protocols or CPU or GPU processes may be used to exchange information or process data in the functional components.

Usually, the camera or recording means are positioned on or within a bag drop kiosk, desk, a self-service bag drop machine, on an Automatic Tag Reading machine or at any point throughout the journey of the baggage in airports or airlines. It will be appreciated that each image comprises sample values or pixels. It will be appreciated that many such cameras or recording means may be coupled to a central computer or server to uniquely identify a baggage among all bags in the process, as will be described in further detail below.

The computer or server comprises machine learning, deep learning and neural networks. Such machine learning and neural networks are well known to the skilled person and comprise a plurality of interconnected nodes. This may be provided a web-service cloud server. In preferred embodiments, the nodes are arranged in a plurality of layers $(L_1, L_2, \ldots L_N)$ which form a backbone neural network. For more specialized feature extraction of images, a plurality of feature abstraction layers is coupled to the backbone neural network to form a deep learning model. The preprocessing method determines a bounding box which defines a region or area within an image which encloses the item or bag.

Preferred embodiments of the invention are able to comprise part of an alerting system that provides a live view and location of a particular bag and sends an alert when a baggage handling anomaly is detected.

Preferred embodiments of the invention are also able to comprise part of an automated baggage delivery system that comprises an automatic arm that pushes the item of baggage towards a collection point when an associated baggage identifier matches the biometric data of a nearby passenger.

Training Process

In an initial phase, the machine learning model is trained using a training database of training data.

Figure 5:
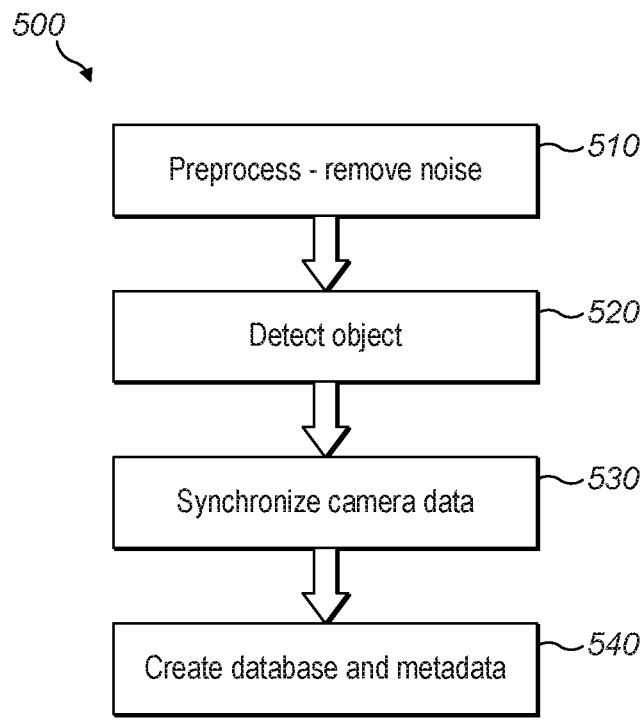
FIG. 5 is a flow diagram showing an example process of creating databases.

FIG. 5 shows a flow diagram illustrating an example process flow 500 for creating a training database comprising training data and associated metadata based on image data obtained from cameras and associated descriptive data (for example, an article tag number and a timestamp).

In a first step, 510 the raw images obtained from the cameras are preprocessed to remove noise. In a second step, 520 each image is analysed to identify whether an object has been detected in the image. In a third step, 530 each camera is synchronized to ensure that data obtained from each camera is collected accurately. In a final step, 540 the training database is created from the processed images and stored with associated metadata. In addition, the machine learning model will also determine a characteristic feature vector associated with each processed image and store that characteristic feature vector in the database.

In preferred embodiments, the characteristic feature vector comprises characteristic values associated with any one or more of a shape, a colour, an alpha numeric text on a bag, a texture of bag, a bag type, a dent, a sticker, or an added marker. However, it will be appreciated that this list is exemplary only and that in principle any characteristic value may be included in the characteristic feature vector.

If required, a further fine-tuning step is performed (not shown) in order to adapt a machine learning model to a specific site by using data of the new environment or domain. The fine-tuning step may also be utilized where two different machine learning models are used. For example, a first machine learning model (for example, a nearest neighbor model) may compare feature vectors of images that were produced by a second machine learning model (for example, a deep learning or convolutional neural network).

Further to the above, the preprocessing step 510 may include the step of removing one or more random sections of a plurality of images in the training data image set in order to improve the accuracy of the model. The relative size and location of the section that is removed may be determined at random using known algorithms. To ensure that the machine learning model did not become overly sensitive to the random removal of sections of the image, in preferred embodiments only 50% of the images in the training data image set have a random section removed. As the entire shape and characteristics of the bag are unavailable, this preprocessing step advantageously forces the machine learning model to identify features that remain observable. This process enables the machine learning model to learn more nuanced details associated with each image which enables the system to uniquely identify a bag where the entire image of the bag is unavailable.

Further to the above, the preprocessing step 510 may include removing images that contain noise. In the ATI, noise is particularly problematic in baggage handling areas that are near to X-ray scanning devices and also where long length cables are used to transmit data. Excessive noise disadvantageously results in missing data points or low-quality images, as may be seen from FIGS. 7A and 7B which show example images 701, 704 that are corrupted due to excessive noise compared to example images 702, 704 that do not contain excessive noise. Accordingly, images that are identified as having excessive noise are removed during the training phase to improve the accuracy of models. As noise in images is manifested as grey pixels, in preferred embodiments the corrupted images may be removed by using three configurable numbers to identify the number of grey pixels in each image as further described with reference to FIG. 6.

Figure 6:
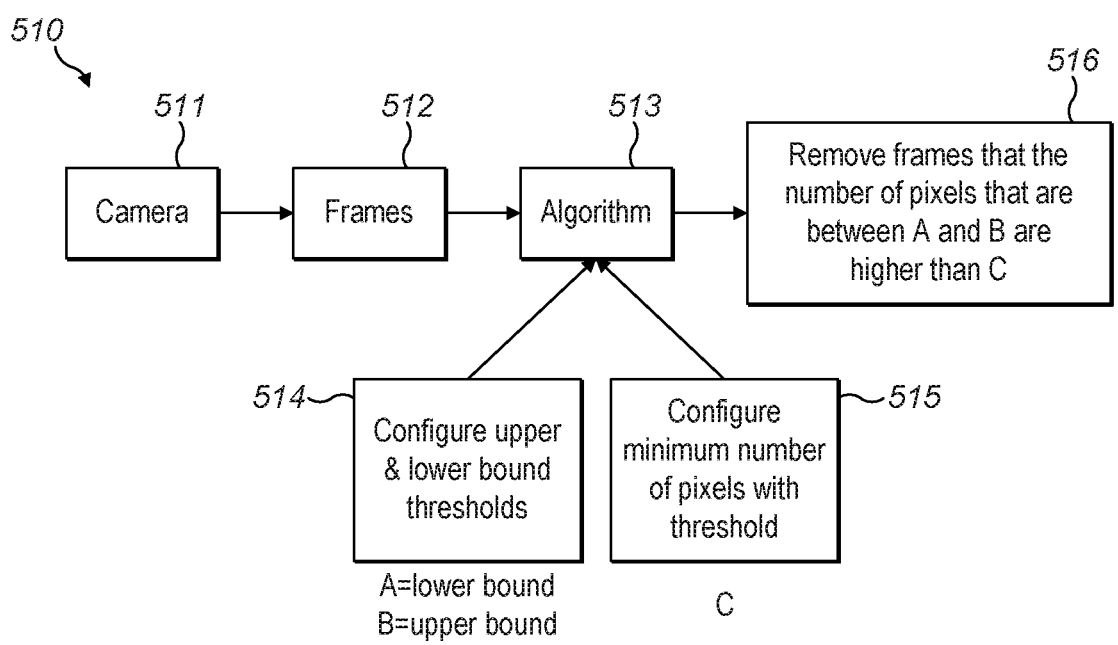
FIG. 6 is a flow diagram showing the sub-steps that comprise the process step of preprocessing to removing noise from input data.
Figure 7A:
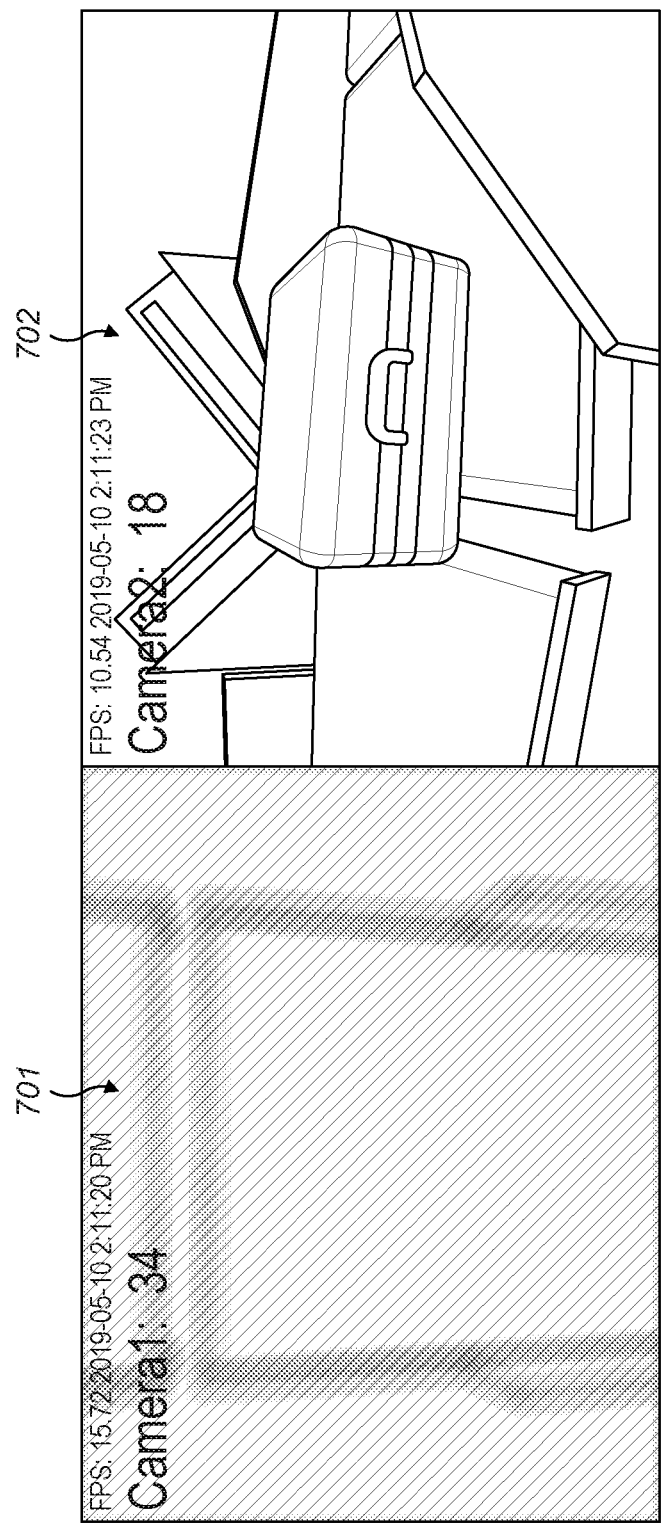
FIGS. 7A and 7B are exemplary images that illustrate removing noise from input camera data.
Figure 7B:
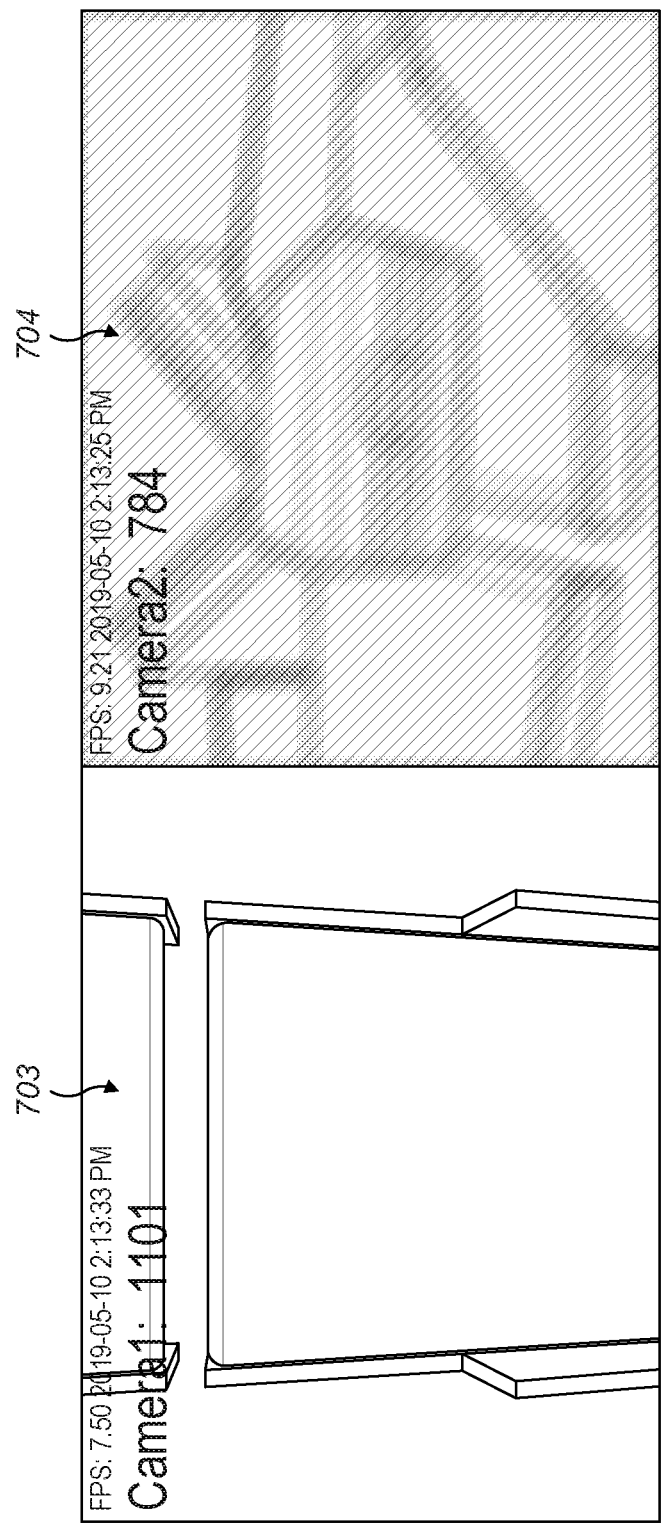

As shown in FIG. 6, the preprocessing step 510 comprises: in a first step 511, obtaining image data from one or more cameras; in a second step 512, analysing each frame within the image data; in a third step 513, applying an algorithm to each frame, whereby the algorithm is firstly configured 514 to receive upper and lower pixel value thresholds and is further configured 515 to identify a minimum number of pixels within the upper and lower thresholds; and in a final step 516, a frame is removed from the image data if the number of pixels in the frame exceeds the minimum number of pixels and falls within the upper and lower pixel value thresholds. In other words, the algorithm first analyses each pixel to identify "grey" pixels by determining whether a greyscale value of that pixel lies within a range defined by the upper and lower boundary values, where the maximum pixel value (corresponding to a white pixel) is 255 and the minimum pixel value (corresponding to a black pixel) is zero. The value of a grey pixel may therefore be defined as an appropriate range of pixel values around the midpoint of this maximum range of values, as defined by the upper and lower boundary values. The algorithm then counts the number of pixels determined to be grey within the frame and determines whether the number of grey pixels exceeds the minimum number of required grey pixels. If so, the image is considered to contain excess amounts of noise and is discarded.

In some embodiments, other filtering and image processing techniques may be used to remove other low-quality images, such as excessively dark or excessively white images.

In further embodiments, frames with excessive amounts of noise may be removed by determining whether an image brightness is greater than a first threshold and less than a second threshold and only processing the image if the image brightness is within the first and second thresholds.

In a preferred embodiment, the images are down sampled to maintain an aspect ratio. For example, the aspect ratio may be down sampled to fit a 256×256 image. This advantageously enables the system to maintain accuracy when processing images obtained from cameras having different resolutions.

In a preferred embodiment, images are cropped before being saved to the training database. The preprocessing step advantageously improves the efficiency and accuracy of correctly identifying an article in a subsequent recognition phase, and additional minimizes storage requirements.

For example, a raw 15-minute input video recording showing baggage moving on a processing belt may occupy about 1.1 GB of data at 640×480 resolution and 5 FPS. However, cropping the images of the bags being sorted can reduce the file size to approximately 10 to 60 MB of data, thereby reducing the storage requirements by a factor of 20-100 times.

An example source code for cropping the images is provided below.

```
def test_ocr(video):
    stream = cv2.VideoCapture(video)
    assert stream.isOpened( ), 'Cannot open file: { }'.format(video)
    res, frame = stream.read( )
    crop = frame[:16, :170]
    crop = cv2.cvtColor(crop, cv2.COLOR_BGR2GRAY)
    crop = 255 - crop
    #cv2.imshow('Crop', crop)
    #key_code = cv2.waitKey(-1)
    (thresh, bw_img) = cv2.threshold(crop, 128, 255,
cv2.THRESH_BINARY | cv2.THRESH_OTSU)
    img = Image.fromarray(bw_img)
    txt = pytesseract.image_to_string(img)
    print(txt)
    cv2.imshow('bw_img', bw_img)
    key_code = cv2.waitKey(-1)
def ocr_timestamp(frame):
    crop = frame[:16, :170]
    crop = cv2.cvtColor(crop, cv2.COLOR_BGR2GRAY)
    crop = 255 - crop
    (thresh, bw_img) = cv2.threshold(crop, 128, 255,
cv2.THRESH_BINARY | cv2.THRESH_OTSU)
    img = Image.fromarray(bw_img)
    txt = pytesseract.image_to_string(img)
    return txt
```

Figure 8:
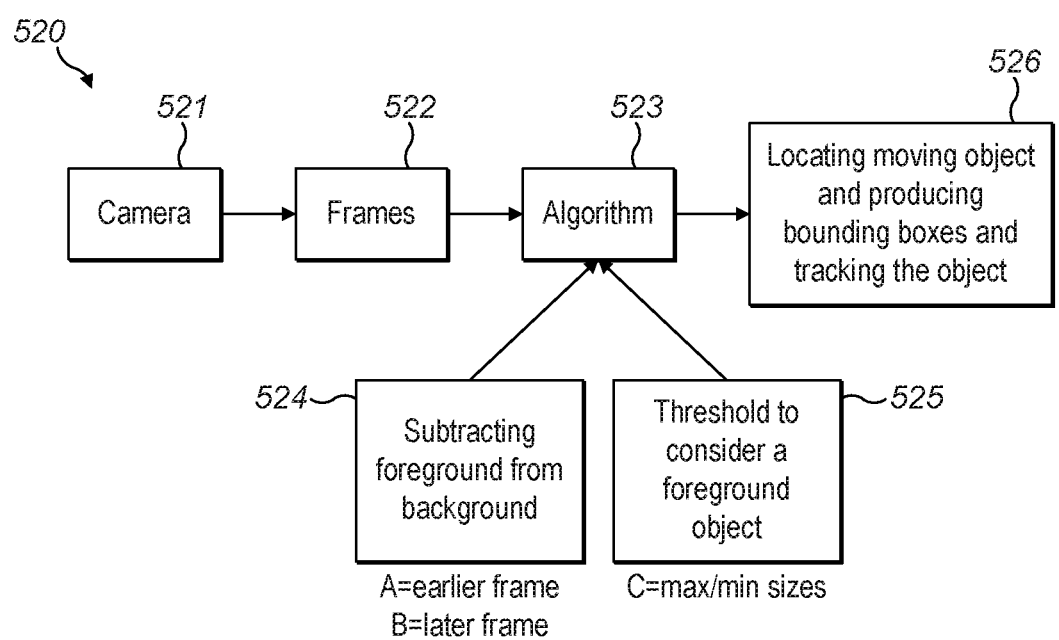
FIG. 8 is a flow diagram showing the sub-steps that comprise the process step of detecting, tracking and measuring moving articles.

In preferred embodiments, the preprocessing step of detecting an object 520 may comprise the steps shown in FIG. 8.

As shown in FIG. 8, the preprocessing step 520 comprises: in a first step 521, obtaining image data from one or more cameras; in a second step 522, analysing each frame within the image data; in a third step 523, applying an algorithm to each frame, whereby the algorithm is firstly configured 524 to subtract the foreground of the image from the background of the image and is further configured 525 to identify a threshold value that identifies an object as a foreground object; and in a final step 526, a moving foreground object is identified, a boundary box is positioned around the identified foreground object and the object is tracked over time.

In a specific embodiment, the algorithm may be configured to perform background subtraction 524 using known motion-based background subtraction methods such as MOG2 (Mean of Gaussian) for detecting and segmenting moving articles of baggage on a conveyor belt. However, other known motion-based background subtraction methods may also be used, such as MOG, CNT, GMG, LSBP.

The use of background subtraction techniques advantageously enables moving objects to be extracted from relatively fixed backgrounds, as well as identifying and isolating foreground objects on a moving backgrounds, such as a conveyor belt. The use of MOG2 is particularly advantageous as it is able to identify articles on a moving background comparatively better than alternative known algorithms.

The accuracy of the system may be further improved by determining the colour of the conveyor belt. This is because a significant proportion of bags handled in the ATI are black or dark coloured and known systems struggle to automatically detect these bags against a conveyor belt, which is also typically black or dark coloured.

Figure 9:
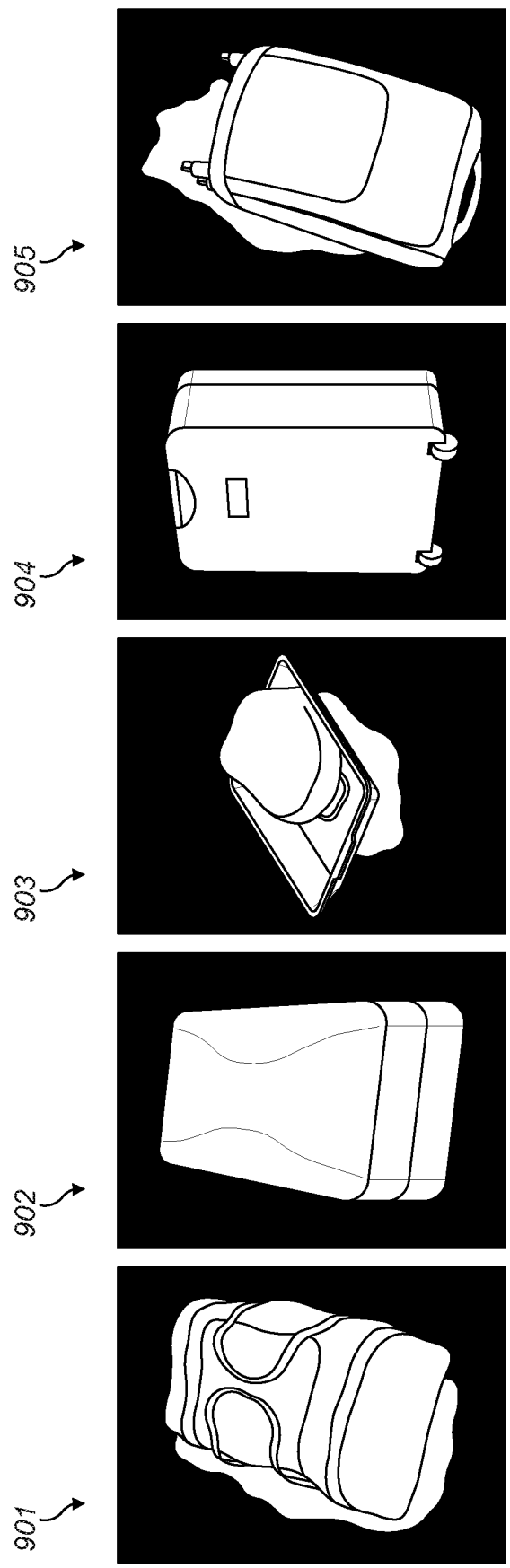
FIG. 9 is an example series of images where background subtraction has been performed.

Example images 901 to 905 are shown in FIG. 9 and illustrate the result of removing the background from images obtained from a camera.

First, a user manually specifies the region of interest (ROI) for each camera. The background segmentation code discards objects detected outside the ROI. This is to prevent distractors, such as moving machinery or people, from triggering false detections.

An example source code showing how a ROI can be obtained from a video stream is provided below.

```
def get_roi(file_path):
    assert os.path.exists(file_path), 'Cannot open video:
{ }'.format(file_path)
    path, file_name = os.path.split(file_path)
    temp, _ = os.path.splitext(file_name)
    config_file_path = os.path.join(path, temp + '.ini')
    config = configparser.ConfigParser( )
    section = "ROI"
    roi = None
    # Configuration file exists, read ROI
    if os.path.exists(config_file_path):
        print('Reading configuration from: { }'.format(config_file_path))
        config.read(config_file_path)
        x1 = config.getint(section, "x1")
        y1 = config.getint(section, "y1")
        x2 = config.getint(section, "x2")
        y2 = config.getint(section, "y2")
        roi = [(x1, y1), (x2, y2)]
    else:
        stream = cv2.VideoCapture(file_path)
        res, frame = stream.read( )
        if res:
            roi = select_roi(frame)
        stream.release( )
        if roi is not None:
            # Save ROI to the config file
            # add the settings to the structure of the file, and lets write it out...
            config.add_section(section)
            config.set(section, "x1", str(roi[0][0]))
            config.set(section, "y1", str(roi[0][1]))
            config.set(section, "x2", str(roi[1][0]))
            config.set(section, "y2", str(roi[1][1]))
            out_file = open(config_file_path, 'w')
            config.write(out_file)
    return roi
```

Once the ROI is established, a number of initial frames from an input video are processed to build a statistical background model. For example, five hundred initial frames may be processed. In preferred embodiments, the background model was generated by training the model with images of an empty baggage conveyor belt running without any bags placed on it.

Figure 10:
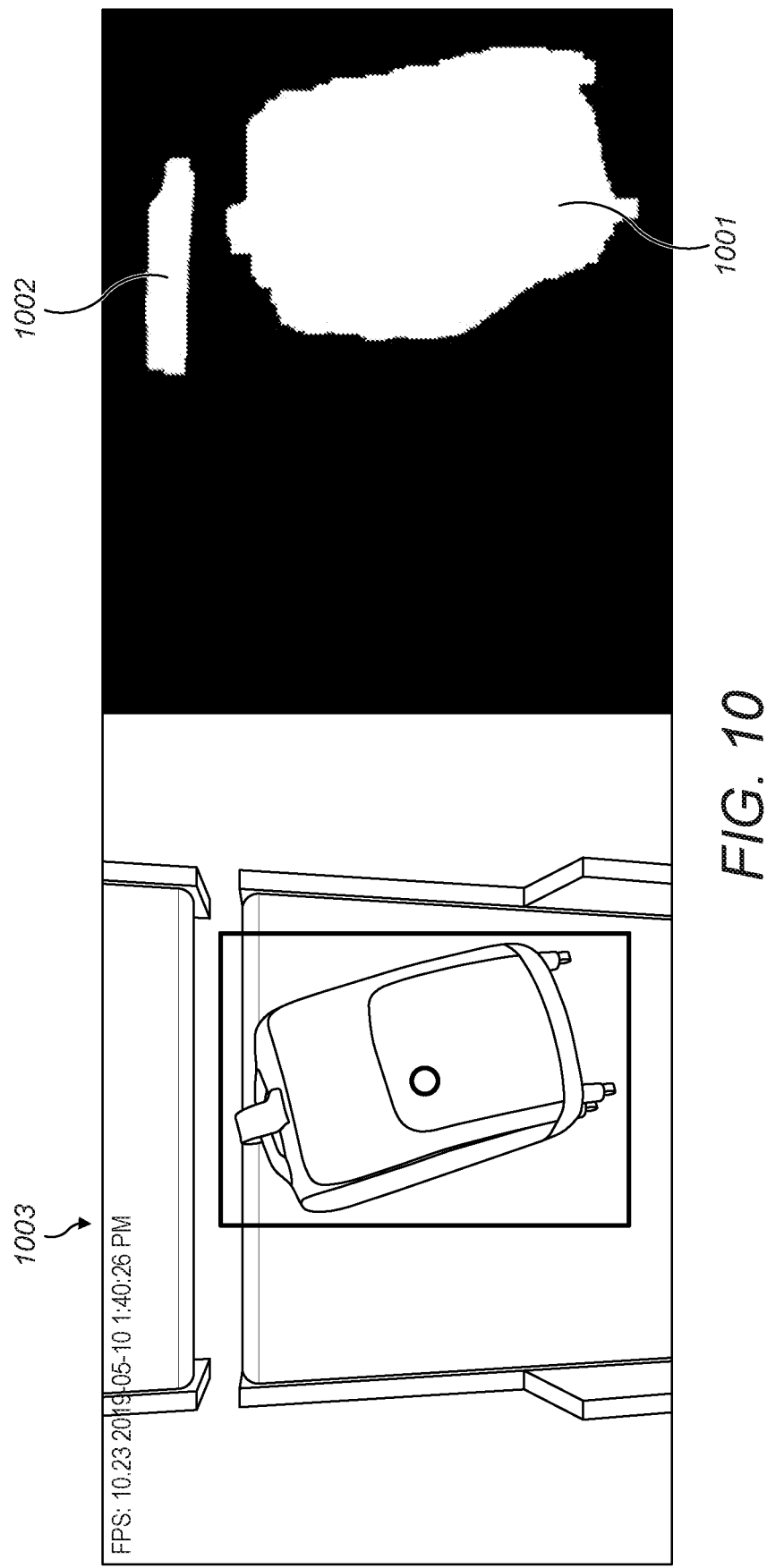
FIG. 10 is an exemplary image obtained from article localizing and tracking cameras.

After the background model is built, the video stream is processed frame by frame to identify and segment moving foreground objects in each frame from the stationary background to produce a foreground mask, as shown in FIG. 10. If the foreground mask includes noise, speckles or close small holes, then known morphological opening and closing techniques may be applied to the foreground mask to remove the noise.

This process may be achieved using the example source code below.

```
def __init__(self, config_path=None):
    self.config_path = config_path
    self.file_path = None
    self.stream = None
    self.frame_width = None
    self.frame_height = None
    # Frames are numbered from 1
    # current_frame hols an index of the last frame read
    self.n_frame = -1
    # Content of the current frame
    self.frame = None
    # ROI as OpenCV rotated rectangle
    self.roi_rect = None
    # Contours (convex hull of each contour is stored) clipped to ROI
    self.contours = None
    # Detections in the current frame
```

```
    self.detections = None
    # Foreground mask of the current frame
    self.fg_mask = None
    self.frame_count = None
    self.fps = None
    # Set default parameters
    # Set ROI (region of interest)
    self.use_roi = False
    # MOG2 detector params
    # When detectShadow is True grey color regions (value = 127) show
the shadow and 255 is foreground
    self.detect_shadow = True
    self.history = 500
    self.var_threshold = 3
    if self.config_path is not None:
        # Read configuration from the file
        self.read_config( )
```

Further to the above, in some embodiments the noise in images introduced by changes to the background and similarities in the background shown in each image can be reduced by improving the background segmentation of an image. In a training phase, this may be achieved by manually specifying a region of interest (ROI) around a bag. Then, within the machine learning environment, manually localizing the boundaries of the bag for between 50 to 200 images. The machine learning model then automatically continues to use the object sizes and characteristics as the ROI for all subsequent bag images by identifying the known ROI outline that most closely resembles a new bag and using the identified ROI outline as a foreground mask for the new bag. This preprocessing step advantageously provides improved results because the machine learning model is not as focused on aspects of the bag as the foreground mask for the bag is predetermined. The machine learning model can therefore analyse similarities in the background of bag images, for example a conveyer belt colour, instead of focusing on the bags themselves. To reduce the importance of the background to the machine learning model, in some embodiments noise is added to the background to force the model to attention to the baggage features.

Pixels in the foreground mask may be grouped into an area of connected pixels, known as a blob, using known connected component analysis techniques. This process advantageously limits the noise and creates a boundary around the entire detected object rather than creating several small ROIs. If a blob spans substantially the entire height or width of a frame, then the entire frame is discarded, as it indicates a serious image corruption. Finally, the shape of each detected blob is calculated. If a blob height, width and area are each within predefined ranges and the spatial position of the blob intersects with a ROI then the blob is considered to be a valid detection. If an article is detected, then a bounding box defining the location of the article within the frame is superimposed on the image according to known techniques.

In the example shown in FIG. 10, two blobs are identified. The first, larger, blob 1001 corresponds to the article being tracked. However, a second, smaller, blob 1002 corresponding to a region between the rollers of a baggage conveyor belt has also been identified. Blob 1002 is not large enough to fall into the predefined range of height, width and area, and so is not determined to be an article to be tracked. Accordingly, in FIG. 10 the location of the bounding box 1003 is correctly placed around the article to be tracked and is not influenced by the presence of blob 1002.

An example source code defining a set of example parameters for grouping pixels into blobs is provided below.

```
    use_roi = True
    detect_shadow = True
    history = 100
    var_threshold = 16
    blob_discard_threshold = 0.8
    min_blob_height = 100
    max_blob_height = 380
    min_blob_width = 100
    max_blob_width = 500
    min_blob_area = 10000
    max_blob_area = 160000
```

In the above, "history" defines the number of frames used to find a moving foreground object. In the above example, a sequence of 100 frames from a video stream are used in order to identify each new foreground object. "var_threshold" defines the threshold of sizes of objects for subtracting from the background. In other words, the "var_threshold" indicates the sensitivity of a detector: the lower the value, the smaller the pixel intensity changes need to be in order to be marked as a foreground pixel. Accordingly, lower values generate more noise and can generate false detections whereas higher values produce less noise, but are susceptible to failing to detect moving objects, for example moving baggage having a similar colour as the background, such as a black bag on a black conveyor belt. The "blob_discard_threshold" parameter defines the threshold for filtering out corrupted frames from the video due to excessive noise, and in the above example is set at 80% of the total number of pixels in the frame. In alternative embodiment, the threshold may be set at 95% of the total number of pixels in the frame. "min_blob_height" and "max_blob_height" define upper and lower thresholds for the vertical height of a blob in pixels, and in the above example the acceptable blob height is set at between 100 and 380 pixels. In alternative embodiments, the acceptable blob height may be set at between 30 and 300 pixels. "min_blob_width" and "max_blob_width" define upper and lower thresholds for the horizontal width of a blob in pixels, and in the above example the acceptable blob width is set at between 100 and 500 pixels. In alternative embodiments the acceptable blob width may be set at between 30 and 400 pixels. "min_blob_area" and "max_blob_area" define upper and lower thresholds for the 2D area of a blob in pixels, and determine whether an identified foreground object should be considered a detected article, such as an item of baggage. In the above example the acceptable blob pixel area is set at between 10,000 and 160,000 pixels. Frames that include blobs which fall outside of the above parameters are discarded.

In alternative embodiments, threshold values for the blob area may be based on a percentage of the total number of pixels in a frame. For example, a lower threshold may be 10% of the total number of pixels in a frame and an upper threshold may be 40% of the total number of pixels in a frame. For a video of 640×480 resolution, these thresholds would correspond to an acceptable blob pixel area of between 30,720 and 122,880 pixels. In another example, a lower threshold may be 5% of the total number of pixels in a frame and an upper threshold may be 50% of the total number of pixels in a frame. For a video of 640×480 resolution, these thresholds would correspond to an acceptable blob pixel area of between 15,360 and 153,600 pixels.

Once detected, the article may be tracked through the number of frames used by the system to identify each foreground object (i.e. the "history") using the following example source code.

```
def analyse_detections(detections):
    print('Analysing flow direction...')
    mean_flow_l = [ ]
    for ndx in range(len(detections[1:])):
        n_frame = detections[ndx].frame_ndx
        prev_frame = detections[ndx-1].frame_ndx
        if prev_frame == n_frame - 1:
            # Detections in the consecutive frame
            c1 = np.array(detections[ndx].center( ))
            c2 = np.array(detections[ndx-1].center( ))
            delta = c1 - c2
            mean_flow_l.append(delta)
        print(delta)
```

To create sufficient data for training models that can identify unique features between different images, a synchronization method is used to identify the same article that is detected by numerous cameras. This is achieved by synchronizing the data obtained from each camera, as the frame rate of each individual camera may vary. In airport environments, baggage travels great distances during the sortation process and may be captured by video cameras at a number of different locations. Identifying the same bag by a number of cameras and identifying the time difference between being detected by each camera enables the system to tag them with a differentiable label.

Resynchronizing the data obtained from each camera is most easily done using articles having distinctive or non-common features (for example unusual shapes or uncommon colours), as they can be readily identified.

In one embodiment, the preprocessing step of synchronizing cameras 530 may comprise the steps shown in FIG. 11A and FIG. 11B.

In a first method 1100, the cameras are synchronized by identifying articles having an unusual and distinctive colour. In a first step 1101, image data is obtained from a plurality of cameras. In a second step 1102, fine boundaries of the detected object are identified for each camera data set. In a third step 1103, an average colour value is identified for the detected object, for example using RGB colour values, for each camera data set. In a fourth step 1104, each detected object is listed by average colour value for each camera data set. In a fifth step 1105, outliers or unusual colours are identified by finding the most distinct colour values for each camera data set. In a sixth step 1106, the patterns are matched between the different camera data sets in order to identify a time difference between the bag being detected by the different cameras, thereby synchronizing the plurality of cameras.

In another embodiment, the preprocessing step of synchronizing cameras 530 may comprise a second method 1110 shown in FIG. 11B. In a first step 1111, image data is obtained from a plurality of cameras. In a second step 1112, fine boundaries of the detected object are identified for each camera data set. In a third step 1113, a time window is determined for each camera data set. In a fourth step 1114, a similarity distance is determined between the different camera data sets. In a fifth step 1115, it is determined whether the similarity between data sets is higher than a predefined threshold. In a sixth step 1116, if the similarity is higher than the predefined threshold then the patterns are matched between the different camera data sets in order to synchronise the plurality of cameras.

Figure 12:
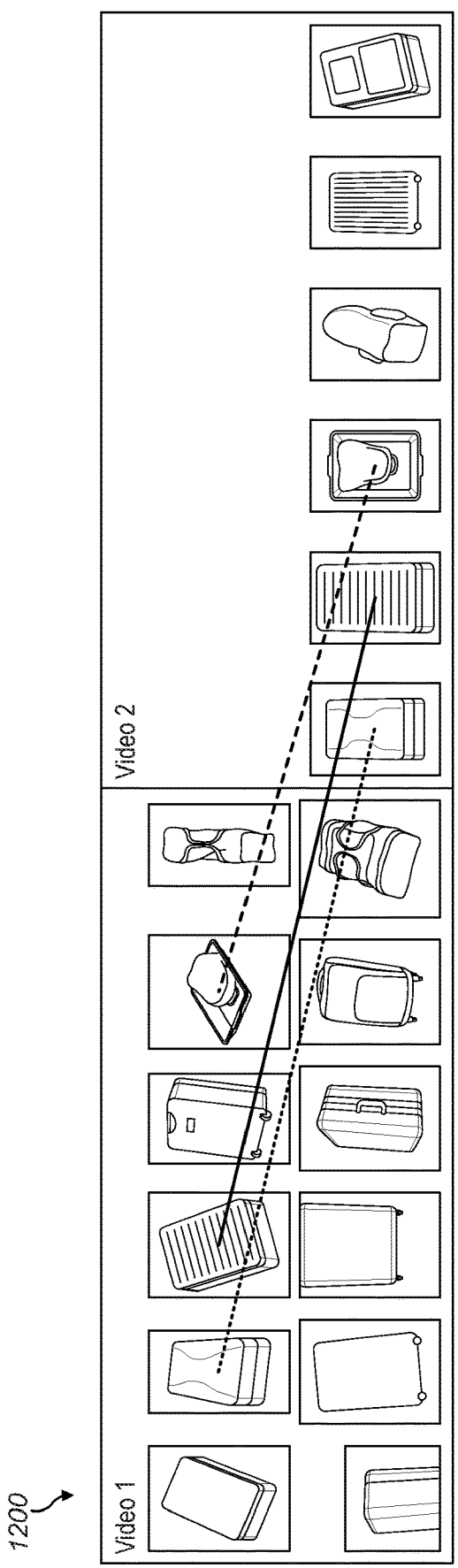
FIG. 12 is an exemplary image obtained during camera synchronization.

FIG. 12 shows an example set of results of matching images of bags 1200 obtained at two different cameras. The lines show the result of matching between two streams using a machine learning model.

The result of above steps is a database of images of articles that are labeled with consistent and similar identifiers for each bag that can be used for training and evaluating models. Each image in the training data set has an associated timestamp and may also include associated identification information, such as a bag tag identifier or passenger biometric data, where known. In preferred embodiments, each detected article is associated with an identifier, such as an external element definition. In some embodiments, the external element definition is an identifier ID such as a License Plate Number generated at check in or a text descriptor of the article.

Learning Models

One specific example of a machine learning method is Metric Learning Approach. The method uses Triplet network architecture to learn low dimensional embeddings of baggage images. To train the models input present triplets consisting of a base baggage, different instance of the same baggage and a different baggage. The training procedure searches for matching baggage images, by searching for nearest neighbours in the embedding space.

Other exemplary approaches are the use of convolutional features from a deep network pre-trained on an auxiliary image identification task (for example ResNet or VGG trained on IMAGENET). For each baggage image, the machine learning builds a fixed-length descriptor by max-pooling these features over channel dimension. The model searches for matching images, by searching for nearest neighbours in the descriptor space.

Another Metric Learning Approach considers Siamese network architecture to learn low dimensional embeddings of baggage images. The data presents pairs of same and different baggage. Images of the same baggage will be created by applying random distortions (for example rotation, perspective warp, intensity/contrast changes) to the base baggage image. Search for matching baggage images, by searching for nearest neighbours in the embedding space.

One other specific example Adapts NetVLAD architecture (originally used for weakly supervised place recognition) for baggage images matching scenario.

Although more or less layers may be used, and it will be appreciated that other backbone neural networks may be used instead of the above methods. Methods might use implementation of loss function for manually tuned neural network architectures or for the article detection and segmentation, and will be known to the skilled person. The preprocessing and machine learning (deep learning and neural network) might be remotely accessible by wired or wireless communication protocols which will be known to the skilled person.

Use Process

As described below with reference to FIG. 13, embodiments of the invention can advantageously be used for uniquely identifying any type of article by comparing the similarity of a number of similar images taken over time, from different angles, or in various locations. In preferred embodiments, the system also associates each image with an identifier associated with each article, such as a passenger related information or a bag tag number. The database can consist of bag images for each flight, flights of an airline, all bags in one airport or various airports, or any combination view of the search criteria.

Figure 13:
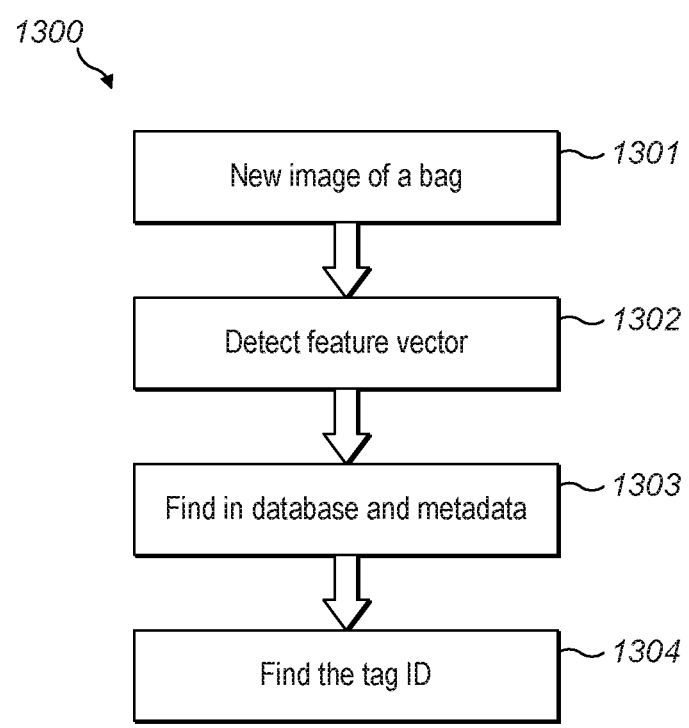
FIG. 13 is a flow diagram showing an example process of the uniquely identifying an article using a new (unseen) image.

FIG. 13 shows an example process 1300 for identifying an article. In a first step 1301, a new image is obtained of the article, for example an article of baggage in an airport environment. In a second step 1302, a characteristic feature vector associated with the new image is determined. In a third step 1303, the characteristic feature vector is found in a search database along with corresponding metadata, for example by using a machine learning model to compare between the characteristic feature vector and each of the characteristic feature vectors in the search database. In a fourth step 1304, the unique identifier associated with the characteristic feature vector, such as a tag ID, is found to uniquely identify the article. The machine learning model may then associate the identified tag ID with the new image of the article.

This process is described in more detail below with reference to FIG. 14 and FIG. 15.

Figure 14:
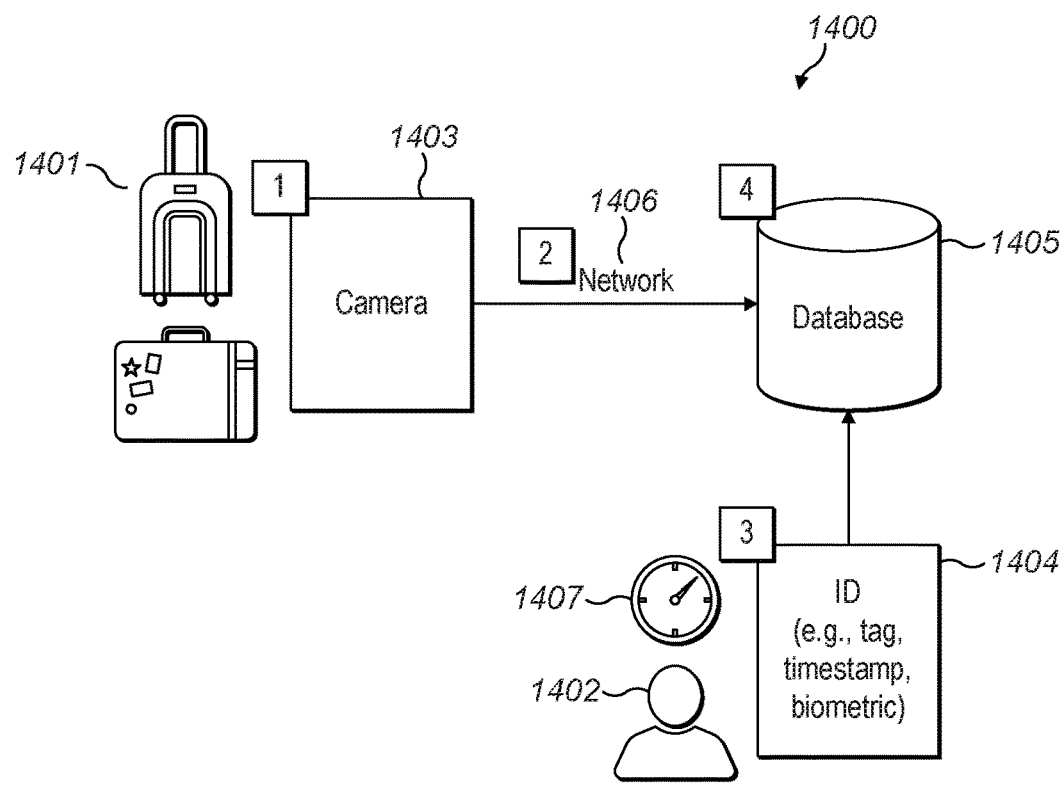
FIG. 14 is a schematic diagram showing an example bag visual registration process.

FIG. 14 illustrates an example process 1400 for registering an article 1401, such as a bag. In specific embodiments, registration may occur when a passenger deposits an article of baggage at a check-in desk or a self-service bag drop system of a departure airport. In FIG. 14, a passenger 1402 deposits their baggage 1401 at a drop point where an initial set of images of the article of baggage is obtained from a camera or video camera 1403. The initial set of images are associated with an identifier 1404 associated with the passenger. An identifier-assigning mechanism associates the images of the article of baggage with the identifier 1404 and stores the images and identifier together in a database 1405, which may be implemented via a network 1406. Examples of identifiers associated with the passenger include a bag tag number, a timestamp 1407, or biometric data associated with the passenger.

In preferred embodiments, the identifier-assigning mechanism is a piece of code that also integrates the obtained images with an automatic tag reader (ATR) timestamp or with a list generated by airlines for each flight that contains a passenger ID and a bag tag number. In preferred embodiments of the invention, the passenger-related information may include passenger name data, Passenger Name Record (PNR) data, flight data, and bag License Plate Number (LPN). Accordingly, the passenger-related information can be used to identify the departure and arrival times of a flight, the departure and arrival locations of a flight, and any connecting flights. The image and associated passenger-related information are then stored in a database.

This process is repeated for all articles of baggage for each customer so that the database contains a complete record of all articles of baggage associated with every checked-in passenger.

An embedding vector is calculated for each image in the database using a trained embedding network. Each embedding vector is represented as an N-dimensional vector in a vector-space. In preferred embodiments, the embedding vectors are 128-dimensional vectors. The relative separation in the vector-space between two embedding vectors, which each represent a different image in the database, indicates the semantic similarity between the two vectors.

Once an article of baggage has been deposited, it will travel along a predefined bag journey for further processing, such as being loaded onto an aircraft. According to embodiments of the invention, cameras placed along the journey path capture images of each article while passing by the camera on their journey.

As described above for obtaining training data, the newly obtained images are preprocessed to extract a ROI. The machine learning model creates an embedding vector for the query image that will be used to identify similarities between the query image of an article and all the images located in a query database.

Figure 15:
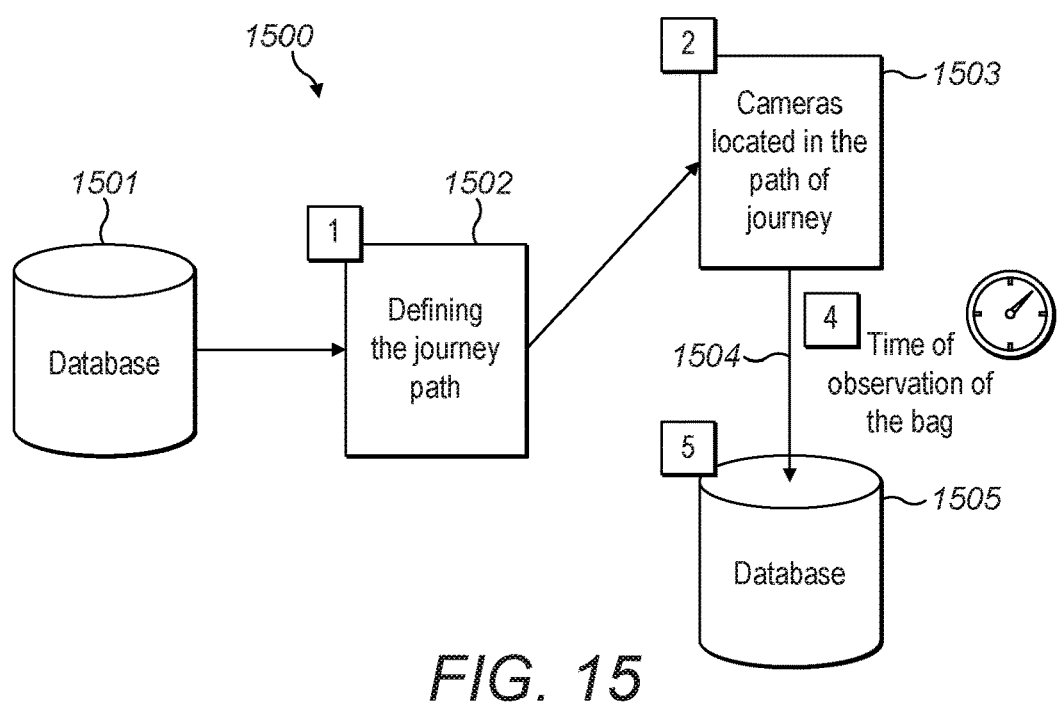
FIG. 15 is a schematic diagram showing an example visual tracking process during a bag journey.

FIG. 15 shows an example visual tracking process 1500 for creating a query database. In FIG. 15, a reference database 1501 is referenced to identify a journey that an article may take to reach a destination. In the Air Transport Industry (ATI), an article is only likely to travel to a destination along a well-defined path, such as a sequence of conveyor belts. Thus, the journey path 1502 can be readily defined from the known starting location (for example, a check in terminal) and the intended destination location (for example, an aircraft loading point) by referencing an inventory of pathways stored in the reference database 1501. Next, a sequence of cameras 1503 are identified that are located along the journey path. Thus, an article travelling along journey path will encounter each of the cameras 1503 in a predefined sequence. Each camera 1503 records the articles that pass by and associates each image of the article with a timestamp 1504 indicating the time that the article was observed by the particular camera. The timestamped image is then saved to a query database 1505 that includes all the images captured of articles travelling along a journey path. As above, an embedding vector is calculated for each image in the database 1505 using a trained embedding network.

For example, the data shown below in Table 5 is an example of data in a query database that is available for matching to an image obtained from a particular camera so that the article of baggage can be identified.

TABLE 5

An exemplary metadata of tag reads from an Automatic Tag Reading device. The table also includes timestamps of the images and the location that bag was observed at that time.

| Tag # | Scanner | Scanned Time |
| --- | --- | --- |
| 3878952962 | TC3 | 2019-06-22 00:00:00 |
| 3783377174 | TC3 | 2019-06-22 00:00:03 |
| 3878892885 | TC3 | 2019-06-22 00:00:04 |
| 5005201941 | TC3 | 2019-06-22 00:00:06 |
| 5005201946 | TC3 | 2019-06-22 00:00:08 |
| 3783388365 | TC3 | 2019-06-22 00:00:12 |
| 3879623176 | TC3 | 2019-06-22 00:00:14 |
| 5005201932 | TC3 | 2019-06-22 00:00:20 |
| 5005201917 | TC3 | 2019-06-22 00:00:21 |
| 5005184124 | TC3 | 2019-06-22 00:00:22 |
| 3783165499 | TC3 | 2019-06-22 00:00:26 |
| 3783097121 | TC3 | 2019-06-22 00:00:27 |

When seeking to identify the newly obtained image of an article, the system 1400 generates a list of images that are most similar to the query image (a list of nearest neighbours). This is achieved by searching the query database 1433 for embedding vectors that are closest, in the Euclidean distance sense, to the query image embedding. This can be efficiently done, as embeddings are low-dimensional real-valued vectors. Adopting such an approach enables the system to learn to use more subtle cues, like the structure of an article's surface or the presence of additional elements, like patterns or regions of different materials, to distinguish between similar articles.

The most similar images produce a lower distance score that can be used to identify the original article. The image may then be stored for future use cases, such as detecting whether any damage has occurred during the journey.

In preferred embodiments, passenger-related information may be used to identify a passenger associated with the article and to propose or provide a list of closest bags to the identified passenger for verification.

Figure 16:
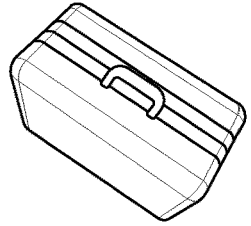
FIG. 16 is an example image obtained during an example process for identifying similar items of baggage.

An example list of nearest neighbours for a sample image is shown in FIG. 16. As shown in the example, the machine learning model provides a list of the 15 images that were identified as being closest to the query image. However, it should be noted that this number is for example only and any number, K, of closest neighbours can be provided. When K is equal to 1, the model only shows the most similar bag.

In some embodiments, additional steps are performed when machine learning and computer vision techniques alone are unable to uniquely identify bag. For example, the timestamp of each set of images obtained for an article of baggage may be compared against an expected journey time. A reduced set of images can be identified based on an expected time window during which the bag would pass by a particular camera location. The bag may then be uniquely identified from the subset of images. Alternatively, a shortlist of similar bags may be presented to a passenger for them to identify which bag is theirs.

Embodiments of the invention may be advantageously leveraged to detect faults in an article handling system as further described below.

In article handling systems, such as baggage sortation systems at airports, each article of baggage follows a specific predefined route through the sortation system to a destination, such as a holding area for loading onto an aircraft. Placing cameras at intervals throughout the route defines a sequence of cameras associated with the journey. Accordingly, each bag travelling on the predefined route will pass by each of the sequence of cameras in order.

As the baggage travels on conveyor belts at a known speed, it is possible to calculate an estimated time of arrival (ETA) for a bag to arrive at each camera. Accordingly, the system can predict when a particular article is scheduled to arrive at a particular processing point and raise an alarm when an article does not appear as anticipated.

This may be achieved by firstly creating a list of articles that are expected to be captured by a selected camera. For example, a particular camera in an arrival airport will expect to detect a bag checked into an arriving flight within an expected time window after that flight has landed. In order to improve the accuracy of the system, in some embodiments a higher probability or weighting may be assigned to the list of articles that are expected to arrive at the location of the camera at a specified time.

Accordingly, each camera will have an associated list of articles, the list including an ETA and an associated customer reference number for each expected bag to be captured by the camera.

The list is created by firstly identifying flight information associated with each article, then identifying a journey to be taken by the article based on the flight information, and finally identifying an estimated time for the article to arrive at a selected camera located on that journey.

Each camera captures images of every article that passes by its field of view and creates a dataset of images for processing. Each image is timestamped and associated with location information so that the exact location of each article can be tracked by the system.

Each image in the dataset is analyzed as described above to identify the customer reference number associated with each article. The system searches for the identified customer reference number in the camera's expected list of articles and, if located in the list, compares the ETA with the timestamp.

If the detected time is within an acceptable threshold of the ETA, the timestamp and the customer ID is sent to the database.

If the timestamp or the current time exceeds the acceptable threshold of the ETA for a plurality of consecutive cameras on the journey for a particular article then an alert is triggered. In specific embodiments, an alarm is triggered when the article is not detected by two consecutive cameras.

The passengers now have their baggage data and images stored and can track the location and status of their luggage in real-time. Damage claims and missing baggage claims are now resolved quickly and efficiently. The service providers can identify the issue very quickly and avoid repeating it by knowing the exact cause of the issue.

Figure 17:
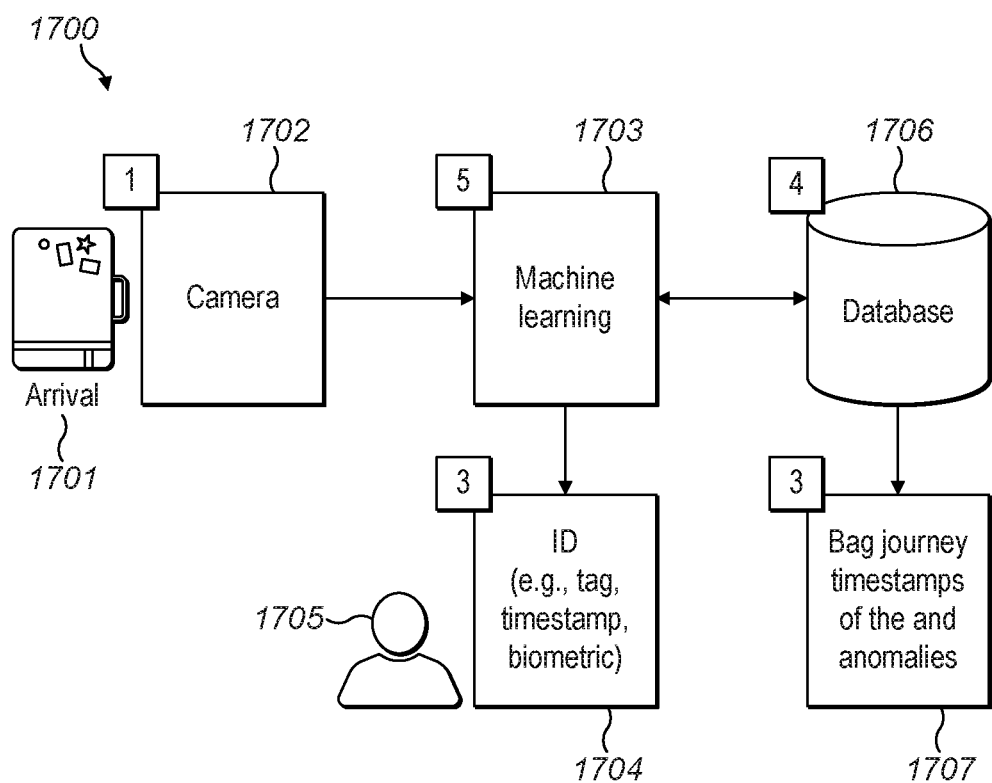
FIG. 17 is a schematic diagram showing an example process for retrieving baggage IDs at an arrival point.

Embodiments of the invention may also enable a passenger to automatically retrieve their article of baggage from a collection point, such as a baggage carousel, as shown in the example process 1700 of FIG. 17.

As shown in FIG. 17, when an article of baggage 1701 arrives at a destination (for example, an arrival airport) one or more cameras 1702 may obtain images of the article 1701. This final set of images may be analysed by a machine learning core 1703 as described above to identify an associated baggage identifier 1704 which is in turn associated with a passenger 1705 who deposited the article of baggage.

For example, a camera at the collection point can obtain a final image of each article of baggage arriving at the collection point. The final image can be used to identify the article and the associated customer identifier, as further described above. When a passenger provides their customer identifier at the collection point, the identified article associated with the customer identifier provided by the passenger is released for collection.

In one specific embodiment, this may be achieved by equipping a baggage carousel with an arm that pushes bags onto the carousel for collection if the customer identifier associated with the bag matches the passenger's customer identifier, which may be associated with the passenger's biometric data.

In an alternative embodiment, once a passenger has presented their biometric ID and the system has identified the customer identifier associated with the biometric ID, the passenger can be presented with one or more final images of articles of baggage. The passenger can then verify which of the articles belongs to them and so collect their article of baggage from the collection point.

In preferred embodiments of the invention, if the passenger has provided biometric data in order to verify or provide their customer identifier, this information is deleted from the airport database at the end of the bag journey.

In the embodiment of FIG. 17, the final set of images processed by the machine learning core 1703 are stored in a database 1706 so that the images obtained throughout the baggage journey may be compared and analysed to determine whether the condition or characteristics of the article of baggage have changed during the journey, or if there was any disruption during the journey taken by the article. If so, a report 1707 can be produced that details the nature of any anomaly, including the approximate time and location that the anomaly occurred.

Alternative embodiments may also enable the identification of articles of baggage that have been lost and taken to a central holding location, such as a "lost and found" department.

Since many items of baggage that are lost no longer have any identification tags or bag tags to uniquely identify the bag, it can be very difficult to match a lost bag with a lost baggage claim. Additionally, the task of manually searching for unique identification marks for each bag is laborious, costly and time consuming. These problems can be ameliorated by capturing images of the lost bags and comparing those images to images of bags obtained at check-in that belong to a passenger making a lost baggage claim, as described above.

In particular embodiments, unique features of the lost bags identified by the system may be matched against text descriptors of features contained in lost baggage claim forms as an alternative to, or in addition to, the use of bag images obtained from check-in. This may be achieved by performing a key word analysis of the lost baggage claim form to identify key characteristics of a bag. For example, key characteristics might include one or more of: bag colour; bag material type; location of wheels; location of handle; luggage tags; brand name; relative size; or a standard IATA classification for the bag. These characteristics can then be matched against the features identified by the machine learning core to identify a shortlist of bags that are most similar to the as-described lost bag from the entire repository of items of lost baggage. The claimant may then be presented with the shortlist of most similar bags to identify which bag is theirs.

In specific embodiments, the relative size of an object may be determined using two or more cameras that each view the object at a different angle, where the two or more cameras are calibrated with a calibrating object having known dimensions. Scaling factors can be applied based on the object's relative proximity to a number of markers located a predefined distance from the camera. This allows the system to accurately meter each of the three Cartesian axes and so provide an accurate estimated size of the object. By contrast, using a single camera results in at least one Cartesian axis being only partially observable which results in measurements that are inaccurate.

Performance and Results

The performance of the system enabled embeddings to be computed for 10,000 cropped bag images in 3 minutes with a Tesla M60 processor. The process takes about 18 ms per image. Each embedding is saved in a database and can be searched for very quickly when performing a nearest-neighbour query. In one exemplary system, 1,000 queries took approximately 30 seconds to execute (approximately 30 ms per query).

The performance and accuracy of an example system according to the invention using a variety of training models is described below. The system may be evaluated using a top-k accuracy metric, which indicates the percentage of searches where the matching baggage is included in top-k most similar bags found by the system.

The results described below relate to the use of four different models for training the machine learning core 1433 to correctly identify an article of baggage. The first model is a well-known triplet loss model for training neural networks. In triplet loss networks, a baseline input is compared to a positive (i.e. "True") input and a negative (i.e. "False") input. The distance from the baseline input to the positive input is minimized, while the distance from the baseline input to the negative input is maximized. In a first round of testing, the triplet loss model was trained using a test database of 38,000 images obtained from a first camera (CAM1). The model was then tested by performing a nearest neighbour search, whereby the system identifies the image that is most similar to a new image.

Table 6 below shows the performance of the system when the nearest neighbour search is performed on the test database, i.e. the CAM1 dataset of 38,000 images.

TABLE 6 nearest neighbour results for a model trained with a test database of 38,000 images and searching the same set of 38,000 test images.

| Metric | Value |
|---|---|
| Top-1 error rate | 22.4% |
| Top-5 error rate | 7.9% |
| Top-10 error rate | 4.2% |
| Top-50 error rate | 1.1% |
| Top-100 error rate | 0.7% |

The nearest neighbour search was performed in the following manner. Firstly, the model computed low dimensional representations (embeddings) using the trained model for each image in the dataset. In the specific example described below, each embedding is represented as a 128 dimensional real-valued vector in a vector space. Secondly, a number "N" of images are randomly selected from the dataset. In this specific example, N=1000 bag images. Next, for each selected image, a number (k) of most similar images are identified by calculating the k closest (in the Euclidean distance sense) embeddings in the vector space. Next, the model evaluates whether the k-number of similar images includes an image corresponding to a bag from the same class as the selected image of the bag. In this context, a bag being in the same class corresponds to matching with a similar bag or a positive detection. A top-k error rate metric is calculated based on this evaluation, to indicate the percentage of queries where the same class of bag was NOT returned within the first top-k number of bags. For example, the "Top-5 error rate" indicates the percentage of queries where a bag from the same class was not returned in the top 5 most similar bags.

Accordingly, as can be seen from Table 6 above, the success rate of the model returning the correct image as the top result is 77.6%, and the success rate of the model returning the correct image in the top 10 results is 95.8%.

Next, the triplet loss model was tested by performing a nearest neighbour search on a database of 11,000 images obtained from a second camera (CAM2) that had not been used to train the model. In other words, this set of 11,000 images was previously unseen by the machine learning model. The results of the nearest neighbour search for the CAM2 dataset is shown below in Table 7.

TABLE 7 nearest neighbour results for a model trained with a test database of 38,000 images and searching a set of 11,000 different images.

| Metric | Value |
|---|---|
| Top-1 error rate | 62% |
| Top-5 error rate | 39% |
| Top-10 error rate | 31% |
| Top-50 error rate | 14% |
| Top-100 error rate | 9% |

As can be inferred from Table 7, the success rate of the model returning the correct image as the top result is 38%, and the success rate of the model returning the correct image in the top 10 results is 69%. Accordingly, when searching for a matching result for a new bag image among 38,000 images that are already "known" to the model (i.e. the CAM1 data set) and the 11,000 images that are "unknown" to the model (i.e. the CAM 2 data set), there is approximately an 80% likelihood of finding the exact bag at best, and approximately a 40% likelihood at worst. When proposing a shortlist of 10 bags for the passenger to select from, the likelihood that the correct bag will be listed in that shortlist is 96% at best and approximately 70% at worst.

The above results can be improved in a number of ways. For example: the search for a bag may be limited to certain flights or a specified time-window; the architecture of the model may be changed; the model may be trained with more data; and ensuring that the cameras that provide the bag images are synchronized will provide higher degrees of accuracy than the above results. By way of comparison, the triplet model described above was trained using a larger training dataset of 74,000 images with data augmentation. In this context, data augmentation means increasing the number and variation in the data by applying various image processing techniques. For example, data augmentation may involve flipping, rotating, scaling, cropping, translating, adding gaussian noise, and/or distorting an image. The performance of the triplet loss model when conducting a nearest neighbour search is shown below in Table 8.

TABLE 8 success rates for identifying the correct article for a model trained with a training dataset of 73,000 images and searching a base dataset of n articles, where n = 100, 200, 300, 400 or 1000.

| Top k | 100 samples | 200 samples | 300 samples | 400 samples | 1000 samples |
|---|---|---|---|---|---|
| k = 1 | 72% | 67% | 63% | 58% | 52% |
| k = 5 | 83% | 87% | 82% | 77% | 74% |
| k = 10 | 94% | 92% | 86% | 84% | 84% |
| k = 50 | 96% | 98% | 97% | 96% | 93% |

The results shown above in Table 8 indicate the success rate of the model in returning the correct image in the top-k number of identified closest images when searching a base dataset of 100, 200, 300, 400 and 1000 articles.

The images in the base datasets included images that had random image distortion, random image rotation, random image scaling, or other photometric distortions. The base dataset included one sample image per bag (the best view of each bag), so for example the base dataset of 100 articles included an image for each individual article. The query image to be identified was an image of a different view (i.e. a non-identical image) of one of the bags in the base dataset. It was then determined whether the base dataset image corresponding to the query image was correctly included in the top-k number of closest images and the results repeated with other images in the base dataset. If so, then a successful match was recorded.

The model was also tested to establish the success rate where the base dataset included one or more images for each of the bags in the sample size. The results of this test are shown below in Table 9.

TABLE 9 success rates for identifying the correct article for a model trained with a training dataset of 73,000 images and searching a base dataset of n articles, where n = 100, 200 or 300 and where there are one or more images for each bag.

| Top k | 100 samples (296 images) | 200 samples (623 images) | 300 samples (924 images) |
|---|---|---|---|
| k = 1 | 78% | 68% | 65% |
| k = 5 | 89% | 89% | 85% |

TABLE 9-continued success rates for identifying the correct article for a model trained with a training dataset of 73,000 images and searching a base dataset of n articles, where n = 100, 200 or 300 and where there are one or more images for each bag.

| Top k | 100 samples (296 images) | 200 samples (623 images) | 300 samples (924 images) |
|---|---|---|---|
| k = 10 | 94% | 92% | 86% |
| k = 50 | 99% | 96% | 96% |

For example, as may be seen above in Table 9, the base dataset of 100 articles includes a total of 296 images of the 100 articles.

The second model is the same triplet-based model used above for the first model, except that the model was trained on a new, larger, training dataset of 173,000 images with data augmentation.

The performance of the triplet loss model when conducting a nearest neighbour search is shown below in Table 10. The results shown in Table 8 are included in parentheses for comparison.

TABLE 10

Comparison of Triplet architectures for two training dataset sizes (173,000 and 74,000 images). The figures in parentheses show the success rates for the model trained with the smaller training database (74,000 images).

| Top k | 100 images | 200 images | 300 images | 400 images | 1000 images |
|---|---|---|---|---|---|
| k = 1 | 73% | 71% | 64% | 59% | 56% |
|  | (72%) | (70%) | (62%) | (57%) | (53%) |
| k = 5 | 92% | 91% | 86% | 82% | 79% |
|  | (93%) | (91%) | (85%) | (80%) | (77%) |
| k = 10 | 96% | 95% | 91% | 88% | 85% |
|  | (97%) | (95%) | (91%) | (87%) | (84%) |
| k = 50 | 99% | 99% | 97% | 96% | 94% |
|  | (99%) | (99%) | (97%) | (96%) | (94%) |

The images in the base datasets included images that had random image distortion, random image rotation, random image scaling, or other photometric distortions. The base dataset included one sample image per bag (the best view of each bag), so for example the base dataset of 100 articles included an image for each individual article. The query image to be identified was an image of a different view (i.e. a non-identical image) of one of the bags in the base dataset. It was then determined whether the base dataset image corresponding to the query image was correctly included in the top-k number of closest images and the results repeated with other images in the base dataset. If so, then a successful match was recorded. The results were averaged over 20 repetitions of the evaluation procedure.

As can be seen from Table 10, the success rates for the model trained by the larger training dataset are slightly better, but not significantly so, than the success rates for the model trained by the smaller training dataset. Accordingly, a larger dataset would be required to further improve the accuracy of the model.

The third model is a well-known Siamese model trained on a training dataset of 74,000 images with data augmentation.

The performance of the triplet loss model when conducting a nearest neighbour search is shown below in Table 11. The results shown in Table 8 (i.e. the Triplet model trained with the same training dataset of 74,000 images) are included in parentheses for comparison.

TABLE 11

Comparison of Siamese and Triplet architectures.
The Triple performance is shown in parentheses.

| Top k | 100 images | 200 images | 300 images | 400 images | 1000 images |
|---|---|---|---|---|---|
| k = 1 | 72% | 67% | 59% | 52% | 49% |
|  | (72%) | (70%) | (62%) | (57%) | (53%) |
| k = 5 | 92% | 89% | 82% | 77% | 74% |
|  | (93%) | (91%) | (85%) | (80%) | (77%) |
| k = 10 | 97% | 93% | 89% | 83% | 81% |
|  | (97%) | (95%) | (91%) | (87%) | (84%) |
| k = 50 | 100% | 99% | 97% | 94% | 92% |
|  | (99%) | (99%) | (97%) | (96%) | (94%) |

As before, the images in the base datasets included images that had random image distortion, random image rotation, random image scaling, or other photometric distortions. The base dataset included one sample image per bag (the best view of each bag), so for example the base dataset of 100 articles included an image for each individual article. The query image to be identified was an image of a different view (i.e. a non-identical image) of one of the bags in the base dataset. It was then determined whether the base dataset image corresponding to the query image was correctly included in the top-k number of closest images and the results repeated with other images in the base dataset. If so, then a successful match was recorded. The results were averaged over 20 repetitions of the evaluation procedure.

As may be seen from Table 11, the Siamese model produced slightly worse success rates than the for the triplet loss model using the same architecture trained with the same training dataset.

The fourth model uses the same triplet-based model used above for the first model, except that the model was trained with a training dataset of 74,000 cropped images with background subtraction applied.

The performance of the triplet loss model when conducting a nearest neighbour search is shown below in Table 12. The figures in parentheses relate to the success rates where the training dataset of 74,000 images are not subjected to background subtraction.

TABLE 12

Comparison of the effect of background subtraction
on the success rate of triplet architectures.

| Top k | 100 images | 200 images | 300 images | 400 images | 1000 images |
|---|---|---|---|---|---|
| k = 1 | 77% | 66% | 58% | 55% | 49% |
|  | (72%) | (70%) | (62%) | (57%) | (53%) |
| k = 5 | 92% | 89% | 84% | 81% | 76% |
|  | (93%) | (91%) | (85%) | (80%) | (77%) |
| k = 10 | 96% | 94% | 90% | 88% | 83% |
|  | (97%) | (95%) | (91%) | (87%) | (84%) |
| k = 50 | 98% | 97% | 98% | 97% | 95% |
|  | (99%) | (99%) | (97%) | (96%) | (94%) |

As before, the images in the base datasets included images that had random image distortion, random image rotation, random image scaling, or other photometric distortions. The base dataset included one sample image per bag (the best view of each bag), so for example the base dataset of 100 articles included an image for each individual article. The query image to be identified was an image of a different view (i.e. a non-identical image) of one of the bags in the base dataset. It was then determined whether the base dataset image corresponding to the query image was correctly included in the top-k number of closest images and the results repeated with other images in the base dataset. If so, then a successful match was recorded. The results were averaged over 20 repetitions of the evaluation procedure.

As may be seen from Table 12, the two sets of results are comparable.

Table 13 illustrates the higher accuracy levels that can be achieved using more complicated techniques and deeper machine learning models that use more pre-processing and data augmentation techniques. For example, the use of randomly removing parts of an image to force the machine learning model to analyse a sub-region of the entire image.

TABLE 13 accuracy levels for identifying the correct article for a model
trained with a training data set of 447,000 images, searching
a base dataset of n articles, where n = 100, 200, 300, 400
and 1000, and where the embedding vector size was 2048-dimensions.

| Top k | 100 images | 200 images | 300 images | 400 images | 1000 images |
|---|---|---|---|---|---|
| k = 1 | 97% | 96% | 96% | 95% | 91% |
| k = 5 | 99% | 99% | 99% | 98% | 97% |
| k = 10 | 100% | 99% | 98% | 97% | 96% |

The results shown in Table 13 show an improvement in accuracy levels over the results shown in each of Tables 8 to 12.

The results of each table above was achieved using a pre-trained ResNet-50 convolution neural network where pre-training was performed on an image database, such as ImageNet, and using an embedding vector size of 2048. The performance of the machine learning model was then tested on 8700 images of a benchmark dataset to ensure the model could be generalized to a wider range of bag images.

In addition, the item handling system and identifying system may be configured in some implementations to process the item according to the determined item type. For example, bags which are identified as being unsuitable for processing along one baggage processing channel may be diverted along an alternative path based on the categorisation.

Embodiments of the invention may be advantageously used to locate missing or lost items, as well as identify the damaged or anomalous bags.

This may be performed by searching a database or storage means for an item having characteristics corresponding to the determined identification of the item. Location data and data defining a time when an item was detected may also be stored in the database and associated with the item.

Thus, a processor may be configured to search a database for items having associated location data and data defining a time when the item was detected which is associated with the determined item identification.

Thus, it will be appreciated that when a bag or item is missing or lost, the database may be advantageously searching a database for matching bags with the characteristics during a predetermined time period at predetermined location. This has the benefit that missing items may be more quickly located.

The following machine learning algorithms may also be used to implement embodiments of the invention. This shows accuracy metrics of different machine learning algorithms. Alternatively, or in addition to uniquely identifying a bag and retrieving the passenger ID, the model can produce a translation from 128-dimensional vector to descriptive labels.

The system 100 may interact with other airport systems in order to output the determined bag type or/and colour to other systems.

This may be performed by way of Web Services Description Language, WSDL, Simple Article Access Protocol (SOAP), or Extensible Markup Language, XML, or using a REST\JSON API call but other messaging protocols for exchanging structured information over a network will be known to the skilled person.

From the foregoing, it will be appreciated that the system, device and method may include a computing device, such as a desktop computer, a laptop computer, a tablet computer, a personal digital assistant, a mobile telephone, a smartphone. This may be advantageously used to capture an image of a bag at any location and may be communicatively coupled to a cloud web service hosting the algorithm.

The device may comprise a computer processor running one or more server processes for communicating with client devices. The server processes comprise computer readable program instructions for carrying out the operations of the present invention. The computer readable program instructions may be or source code or article code written in or in any combination of suitable programming languages including procedural programming languages such as Python, C, article orientated programming languages such as C#, C++, Java, and their related libraries and modules.

Exemplary embodiments of the invention may be implemented as a circuit board which may include a CPU, a bus, RAM, flash memory, one or more ports for operation of connected I/O apparatus such as printers, display, keypads, sensors and cameras, ROM, and the like.

The wired or wireless communication networks described above may be public, private, wired or wireless network. The communications network may include one or more of a local area network (LAN), a wide area network (WAN), the Internet, a mobile telephony communication system, or a satellite communication system. The communications network may comprise any suitable infrastructure, including copper cables, optical cables or fibres, routers, firewalls, switches, gateway computers and edge servers.

The system described above may comprise a Graphical User Interface. Embodiments of the invention may include an on-screen graphical user interface. The user interface may be provided, for example, in the form of a widget embedded in a web site, as an application for a device, or on a dedicated landing web page. Computer readable program instructions for implementing the graphical user interface may be downloaded to the client device from a computer readable storage medium via a network, for example, the Internet, a local area network (LAN), a wide area network (WAN) and/or a wireless network. The instructions may be stored in a computer readable storage medium within the client device.

As will be appreciated by one of skill in the art, the invention described herein may be embodied in whole or in part as a method, a data processing system, or a computer program product including computer readable instructions. Accordingly, the invention may take the form of an entirely hardware embodiment or an embodiment combining software, hardware and any other suitable approach or apparatus.

The computer readable program instructions may be stored on a non-transitory, tangible computer readable medium. The computer readable storage medium may include one or more of an electronic storage device, a magnetic storage device, an optical storage device, an electromagnetic storage device, a semiconductor storage device, a portable computer disk, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk.

The following clauses are included to further describe the invention.

1. A method of tracking an article comprising the steps of:

receiving a first image of a first article and associating the first article with a customer identifier;

storing the first image and associated customer identifier in a database containing a plurality of images of different articles, each article being associated with a customer identifier;

calculating, for each image in the database, a characteristic vector associated with each article;

plotting each characteristic vector in a hyperspace;

receiving a further image of the first article during a journey;

calculating a further characteristic vector based on the further image of the first article;

plotting the further characteristic vector in the hyperspace;

calculating a score corresponding to the spatial separation between the further characteristic vector and each of the other characteristic vectors in the hyperspace;

determining a subset of characteristic vectors corresponding to the most similar images based on the spatial separation score;

identifying from the subset of characteristic vectors the closest characteristic vector; and identifying the customer identifier associated with the closest characteristic vector.

2. A method for uniquely identifying an item for processing by an item handling system from a departure point, A, to an arrival point, C, in the item handling system, comprising the steps of:

defining a route traversed by an equipment for transporting a plurality of items, preferably wherein the equipment has an item storage hold and the plurality of items are stored within the item storage hold, between the departure point and the arrival point;

determining an associated departure time and departure date for the equipment; acquiring an image of the item and an associated timestamp of when the image of the item was acquired at one or more points, B, along the route between the departure point and the arrival point and data defining the location where the image was acquired;

comparing the image to a plurality of images preferably stored in a database and captured at bag drop, wherein each image of the plurality of images is associated with a respective one of the plurality of items, and wherein each of the plurality of images is associated with a different passenger identifier, to determine a subset of images from the plurality of images using a model; and associating the acquired image or item with a unique identifier associated with a passenger travelling between the origin and destination based on:

the subset of similar images and their associated identifiers;

the timestamp associated with the item or acquired image;

received data defining the origin and the destination; and the data defining the location of where the image of the item was acquired wherein the data is preferably stored in a passenger name record database.

The invention claimed is:

1. A method for identifying and tracking an article, the method comprising the steps of:
   a. receiving a plurality of images of a first article following a path between an origin and a destination, wherein the plurality of images comprises a first set of images captured, by a first recording device, at a first location between the origin and destination and a second set of images captured, by a second recording device, at a second location between the origin and destination, wherein the first location is different from the second location and each of the first and second locations is associated with a list of expected articles that are predicted to pass each respective location, wherein the origin is a bag drop location and the destination is a bag collection location;
   b. determining a first characteristic vector based on the received image wherein the first characteristic vector is defined by a plurality of characteristic features associated with the first article and a degree of similarity between the first characteristic vector and each of a plurality of predetermined characteristic vectors, wherein each predetermined characteristic vector is associated with a set of training images each corresponding to a previously identified article;
   c. comparing the first characteristic vector with a set of predetermined characteristic vectors wherein each of the set of predetermined characteristic vectors is associated with an identifier; and
   d. based on the comparison, associating the first article with the identifier associated with a corresponding one of the predetermined characteristic vectors or associating the first article with a new identifier.

2. The method of claim 1, further comprising transmitting the identifier associated with the first article to a remote system for tracking the first article during a journey.

3. The method of claim 1, wherein each characteristic vector comprises any one or more of features defining shape, colour, alpha-numeric text, texture, bag type, a sticker characteristic of the bag, a buckle, lock, retractable handle straps, wheel, zip, or material type associated with an article.

4. The method of claim 3, wherein the plurality of characteristic features includes a size of the first article, and wherein the size of the first article is determined using a plurality of cameras that are each calibrated with a calibrating object having known dimensions.

5. The method of claim 1, further comprising detecting an article by using a background subtraction algorithm to generate a foreground mask image.

6. The method of claim 5, further comprising generating the foreground mask image by creating a background model.

7. The method of claim 6, further comprising generating a different background model for each of a plurality of locations, or further comprising identifying a plurality of different bag outlines and selecting one of the plurality of different bag outlines as the foreground mask.

8. The method of claim 1, further comprising grouping pixels associated with a foreground mask image into continuous regions of pixels having the same colour value.

9. The method of claim 8, further comprising determining a width or height of each of the continuous regions and discarding pixels associated with these regions if the regions extend an entire width or height of a frame.

10. The method of claim 1, wherein the set of predetermined characteristic vectors is further determined based on a timestamp defining the time each training image was captured.

11. The method of claim 10, wherein the set of predetermined characteristic vectors is further determined based on a calculated journey path associated with the first article, and wherein the journey path is calculated based on location data associated with the origin and destination.

12. The method of claim 1, further comprising down sampling each training image to maintain an aspect ratio of each image.

13. The method of claim 12, further comprising applying any one of a random rotation, a random scale change, or a random photometric distortion to one or more training images.

14. The method of claim 12, further comprising determining whether an image brightness is greater than a first threshold or less than a second threshold and only processing the image if the image brightness is within the first and second thresholds.

15. The method of claim 1, further comprising identifying a threshold time for an article to arrive at the first or second location, and further comprising sending an alert if the article is not recorded at the first or second location by the recording device before a current time exceeds the threshold time, or sending an alert if the article is not detected by consecutive recording device on a calculated journey path.

16. The method of claim 1, further comprising receiving a plurality of images associated with each article at each location, or further comprising removing one or more of the plurality of images by identifying images of the article where a number of pixels having a pixel value lying between an upper and a lower pixel value threshold exceeds a minimum value.

17. The method of claim 1, further comprising synchronizing a plurality of recording device by identifying an article having a unique characteristic by determining an average colour value for articles recorded by each recording device and matching the article between data recorded by each recording device to identify a time difference between each recording device.

18. The method of claim 1, wherein each of the set of predetermined characteristic vectors is determined by randomly deleting a first portion of each corresponding training image and determining each predetermined characteristic vector based on the remaining portion of the respective image.

19. A system for tracking an article comprising:
   a memory; and
   at least one computing device configured to:
   a. receive a plurality of images of a first article following a path between an origin and a destination, wherein the plurality of images comprises a first set of images captured, by a first recording device, at a first location between the origin and destination and a second set of images captured, by a second recording device, at a second location between the origin and destination, wherein the first location is different from the second location and each of the first and second locations is associated with a list of expected articles that are predicted to pass each respective location, wherein the origin is a bag drop location and the destination is a bag collection location;
b. determine a first characteristic vector based on the received image wherein the first characteristic vector is defined by a plurality of characteristic features associated with the first article and a degree of similarity between the first characteristic vector and each of a plurality of predetermined characteristic vectors, wherein each predetermined characteristic vector is associated with a set of training images each corresponding to a previously identified article;
C. compare the first characteristic vector with a set of predetermined characteristic vectors wherein each of the set of predetermined characteristic vectors is associated with an identifier; and
d. based on the comparison, associate the first article with the identifier associated with a corresponding one of the predetermined characteristic vectors or associating the first article with a new identifier.

20. A non-transitory computer-readable medium embodying a program that, when executed by at least one computing device, causes the at least one computing device to:
a. receive a plurality of images of a first article following a path between an origin and a destination, wherein the plurality of images comprises a first set of images captured, by a first recording device, at a first location between the origin and destination and a second set of images captured, by a second recording device, at a second location between the origin and destination, wherein the first location is different from the second location and each of the first and second locations is associated with a list of expected articles that are predicted to pass each respective location, wherein the origin is a bag drop location and the destination is a bag collection location;
b. determine a first characteristic vector based on the received image wherein the first characteristic vector is defined by a plurality of characteristic features associated with the first article and a degree of similarity between the first characteristic vector and each of a plurality of predetermined characteristic vectors, wherein each predetermined characteristic vector is associated with a set of training images each corresponding to a previously identified article;
c. compare the first characteristic vector with a set of predetermined characteristic vectors wherein each of the set of predetermined characteristic vectors is associated with an identifier; and
d. based on the comparison, associate the first article with the identifier associated with a corresponding one of the predetermined characteristic vectors or associating the first article with a new identifier.

* * * * *